United States Patent
Li et al.

(10) Patent No.: US 9,224,121 B2
(45) Date of Patent: Dec. 29, 2015

(54) DEMAND-DRIVEN COLLABORATIVE SCHEDULING FOR JUST-IN-TIME MANUFACTURING

(75) Inventors: Wen-Syan Li, Fremont, CA (US); Heng Wang, Shanghai (CN); Gufei Sun, Shanghai (CN)

(73) Assignee: SAP SE, Walldorf (DE)

( * ) Notice: Subject to any disclaimer, the term of this patent is extended or adjusted under 35 U.S.C. 154(b) by 811 days.

(21) Appl. No.: 13/229,199

(22) Filed: Sep. 9, 2011

(65) Prior Publication Data

US 2013/0066455 A1   Mar. 14, 2013

(51) Int. Cl.
*G06Q 10/08*   (2012.01)

(52) U.S. Cl.
CPC ................ *G06Q 10/087* (2013.01)

(58) Field of Classification Search
CPC ......... G06N 3/12; G06F 19/00; G06Q 10/087
USPC ............. 700/100, 48, 99, 103; 705/14, 25, 29
See application file for complete search history.

(56) References Cited

U.S. PATENT DOCUMENTS

| | | | |
|---|---|---|---|
| 5,093,794 A * | 3/1992 | Howie et al. ................. 700/100 |
| 5,319,781 A * | 6/1994 | Syswerda .................... 705/7.25 |
| 5,644,727 A | 7/1997 | Atkins | |
| 5,852,811 A | 12/1998 | Atkins | |
| 6,321,205 B1 | 11/2001 | Eder | |
| 6,393,406 B1 | 5/2002 | Eder | |
| 6,591,153 B2 * | 7/2003 | Crampton et al. ............ 700/103 |
| 6,615,092 B2 * | 9/2003 | Bickley et al. ................. 700/99 |
| 6,910,017 B1 * | 6/2005 | Woo et al. .................... 705/7.29 |
| 7,000,141 B1 | 2/2006 | Karlsson et al. | |

(Continued)

FOREIGN PATENT DOCUMENTS

| | | |
|---|---|---|
| EP | 2270686 A1 | 1/2011 |
| WO | 2008087162 A1 | 7/2008 |

OTHER PUBLICATIONS

Soares et al., 2009 journal article, "A new multi-objective optimization method for master production scheduling problems based on genetic algorithm", International Journal of Advanced Manufacturing Technology (2009) 41:549-567.*

(Continued)

*Primary Examiner* — Robert Fennema
*Assistant Examiner* — Fenyang Stewart
(74) *Attorney, Agent, or Firm* — Brake Hughes Bellermann LLP

(57) ABSTRACT

A schedule manager may include a chromosome comparator configured to compare a plurality of schedule chromosomes, each schedule chromosome including a potential schedule of use of manufacturing resources within one or more time intervals in producing one or more items, and configured to compare each of the plurality of schedule chromosomes relative to constraints, to thereby output a selected subset of the plurality of schedule chromosomes. The schedule manager may include a chromosome combiner configured to combine schedule chromosomes of the selected subset to obtain a next generation of schedule chromosomes for output to the chromosome comparator and for subsequent comparison therewith of the next generation of schedule chromosomes with respect to the constraints, as part of an evolutionary loop of the plurality of schedule chromosomes between the chromosome comparator and the chromosome combiner, and a scheduler configured to select a selected schedule chromosome therefrom.

20 Claims, 17 Drawing Sheets

(56) References Cited

U.S. PATENT DOCUMENTS

| | | | |
|---|---|---|---|
| 7,171,375 B2* | 1/2007 | Clarke | 705/7.14 |
| 7,499,766 B2* | 3/2009 | Knight et al. | 700/107 |
| 7,580,848 B2 | 8/2009 | Eder | |
| 7,593,905 B2 | 9/2009 | He | |
| 8,112,300 B2* | 2/2012 | Harper | 705/7.26 |
| 8,301,776 B2 | 10/2012 | Hebert et al. | |
| 8,380,960 B2 | 2/2013 | Jia et al. | |
| 8,744,888 B2 | 6/2014 | Li et al. | |
| 2001/0034628 A1 | 10/2001 | Eder | |
| 2001/0053991 A1 | 12/2001 | Bonabeau | |
| 2002/0013754 A1 | 1/2002 | Frank et al. | |
| 2002/0046143 A1 | 4/2002 | Eder | |
| 2002/0091605 A1 | 7/2002 | Labe, Jr. et al. | |
| 2003/0046130 A1* | 3/2003 | Golightly et al. | 705/7 |
| 2003/0233304 A1 | 12/2003 | Dhurandhar et al. | |
| 2004/0044633 A1 | 3/2004 | Chen | |
| 2005/0097559 A1 | 5/2005 | He | |
| 2005/0177833 A1 | 8/2005 | Sauermann | |
| 2007/0136115 A1 | 6/2007 | Senturk Doganaksoy et al. | |
| 2007/0156555 A1 | 7/2007 | Orr | |
| 2008/0313065 A1 | 12/2008 | Eder | |
| 2009/0070275 A1 | 3/2009 | Frank et al. | |
| 2010/0023564 A1 | 1/2010 | Yerneni et al. | |
| 2010/0076908 A1 | 3/2010 | Frank | |
| 2010/0077449 A1 | 3/2010 | Kwok et al. | |
| 2010/0228685 A1 | 9/2010 | Barsade et al. | |
| 2010/0318495 A1 | 12/2010 | Yan et al. | |
| 2010/0318559 A1 | 12/2010 | Yan et al. | |
| 2010/0325281 A1 | 12/2010 | Li et al. | |
| 2011/0173034 A1* | 7/2011 | Riepshoff et al. | 705/7.11 |
| 2011/0173042 A1* | 7/2011 | Riepshoff et al. | 705/7.26 |
| 2011/0282806 A1 | 11/2011 | Wilcox | |
| 2012/0053970 A1 | 3/2012 | Bhamidipaty et al. | |
| 2012/0053973 A1 | 3/2012 | Elazouni et al. | |
| 2012/0062933 A1* | 3/2012 | Zeng et al. | 358/1.15 |
| 2012/0226624 A1* | 9/2012 | Song et al. | 705/338 |
| 2013/0006988 A1 | 1/2013 | Li et al. | |
| 2013/0066774 A1 | 3/2013 | Li et al. | |
| 2013/0268307 A1 | 10/2013 | Li et al. | |

OTHER PUBLICATIONS

Kuttner, Rein. "Industrial Engineering—Innovation as Competitive Edge for SME" 4th International DAAAM Conference. Apr. 29-30, 2004, Tallinn, Estonia. website accessed Mar. 19, 2015: http://innomet.ttu.ee/daaam04/proceedings/Production%20Management/Kyttner.pdf.*

Extended European Search Report for EP Application No. 12005802.9, mailed Jan. 7, 2013, 8 pages.

Ajay, "What is SAP HANA?", retrieved on Dec. 20, 2012 from http://sapignite.com/what-is-sap-hana/, Jan. 15, 2011, 14 pages.

Aulbach, et al, "Multi-Tenant Databases for Software as a Service: Schema-Mapping Techniques", SIGMOD '08, Jun. 9-12, 2008, 12 pages.

Extended EP Search Report for EP Application No. 10006450.0, mailed Oct. 14, 2010, 10 pages.

Li, et al, "Placement of Multi-Tenant Database Applications for SaaS", SAP Research Center, China, 2009, 12 pages.

Phan, et al, "A Request-Routing Framework for SOA-Based Enterprise Computing", PVLDB '08, Aug. 23-28, 2008, 12 pages.

Phan, et al, "Heuristics-Based Scheduling of Composite Web Service Workloads", MW4SOC '06, Nov. 27-Dec. 1, 2006, 6 pages.

Plattner, et al, "DBFarm: A Scalable Cluster for Multiple Databases", LNCS vol. 4290, 2006, pp. 180-200.

Yang, et al, "A Scalable Data Platform for a Large Number of Small Applications", 4th Biennial Conference on Innovative Data Systems Research (CIDR), Jan. 4-7, 2009, 10 pages.

Wustenhoff, Edward, "Service Level Agreement in the Data Center", Sun Microsystems, Inc., Apr. 2002, 12 pages.

Russell et al., "Artificial Intelligence (A Modern Approach)", Chapter 3, Exercises 3.1-3.21, 1995, pp. 87-91.

Phan et al., "Load Distribution of Analytical Query Workloads for Database Cluster Architectures", In Proceedings of the International Conference on Extended Database Technology, Mar. 25-30, 2008, 12 pages.

Oliveira et al., "Benchmark Testing of Simulated Annealing, Adaptive Random Search and Genetic Algorithms for the Global Optimization of Bioprocesses", In International Conference on Adaptive and Natural Computing Algorithms, 2005, p. 292.

Azar et al., "On-Line Load Balancing of Temporary Tasks", Journal of Algorithms, vol. 22, Issue 1, Jan. 1997, 16 pages.

Qu Bin, "An Immune Algorithm for Optional Selection Problem of Investment Projects," Fifth International Conference of Natural Computation, Aug. 14-16, 2009, pp. 8-11.

Goffe et al., "Global Optimization of Statistical Functions with Simulated Annealing", University of Texas Center for High Performance Computing, May 1993, pp. 65-99.

Graham, R. L., "Bounds for Certain Multiprocessing Anomalies", Bell Systems Technical Journal, vol. XLV, No. 9, Nov. 1966, pp. 1563-1581.

Hamilton, James, "On Designing and Deploying Internet-Scale Services", In Proceedings of the 21tst Large Installation System Administration Conference (LISA '07), 2007, pp. 233-244.

Hart et al., "A Formal Basis for the Heuristic Determination of Minimum Cost Paths", IEEE Transactions on Systems Science and Cybernetics, vol. 4, No. 2, Jul. 1968, pp. 100-107.

Land et al., "An Automatic Method of Solving Discrete Programming Problems", Econometrica, vol. 28, No. 3, Jul. 1960, pp. 497-520.

* cited by examiner

302 Time Intervals

| 304 Parts Production Lines | Line 1 | Part01 | Part01 | Part02 | Part02 | Idle | Part02 | Part02 | Part01 | ...... |
| --- | --- | --- | --- | --- | --- | --- | --- | --- | --- | --- |
| | Line 2 | Part11 | Part11 | Idle | Part12 | Part12 | Part11 | Part12 | Idle | ...... |
| | Line 3 | Part22 | Part21 | Part22 | Part21 | Idle | Idle | Part22 | Part21 | ...... |

| 306 Parts Suppliers | Supplier1 | 500 | Idle | Idle | Idle | Idle | Idle | 200 | Idle | ...... |
| --- | --- | --- | --- | --- | --- | --- | --- | --- | --- | --- |
| | Supplier2 | Idle | Idle | 200 | Idle | Idle | 200 | Idle | Idle | ...... |
| | Supplier3 | Idle | Idle | Idle | 1000 | Idle | Idle | Idle | Idle | ...... |

| 308 Assembly Lines | Assembly1 | Car01 | Car01 | Car02 | Idle | Car02 | Car02 | Car02 | Car01 | ...... |
| --- | --- | --- | --- | --- | --- | --- | --- | --- | --- | --- |
| | Assembly2 | Car02 | Car01 | Car02 | Car02 | Idle | Car01 | Car02 | Car1 | ...... |

| Analysis | Max Profit | | | | | | 1406 | |
|---|---|---|---|---|---|---|---|---|
| Scheduling | | 2011-05-1400 | 2011-05-14 03 | 2011-05-14 06 | 2011-05-14 09 | 2011-05-14 12 | 2011-05-14 15 | 2011-05-14 |
| Assembly Line | | | | | | | | |
| Assembling Pipe Line1 | | Blue Martini | Yellow Jacket | Yellow Jacket | | Blue Martini | Yellow Jacket | Yellow Jacket |
| Assembling Pipe Line2 | | Yellow Jacket | Yellow Jacket | Yellow Jacket | Yellow Jacket | Bloody Mary | Bloody Mary | White Russian |
| Assembling Pipe Line3 | | White Russian | White Russian | Blue Martini | Blue Martini | Blue Martini | Blue Martini | Bloody Mary |
| Assembling Pipe Line4 | | Yellow Jacket | Yellow Jacket | Bloody Mary | Bloody Mary | Bloody Mary | Bloody Mary | Bloody Mary |
| Part Line | | | | | | | | |
| Line00 | | 3D | 3D | I4 | V12 | V12 | I4 | V6 |
| Line01 | | 4D Stretched | 4D Stretched | 4D Stretched | 4D | 3D | | Hatchback |
| Line02 | | Auto 6sp | Manual 4*4 | Auto 5sp | | | | Auto 5sp |
| Line03 | | Manual 5sp | Manual 5sp | | Auto 5sp | | | |
| Supplier | | | | | | | | |
| PART1Supplier | | | 500 | | | | | |
| PART20Supplier | | | | | | | | |
| PART25Supplier | | 100 | | | | | | |
| PART30Supplier | | | | | | | | |
| PART35Supplier | | | | | | | | 100 |
| PART16Supplier | | | | 1000 | | 1000 | 100 | |
| PART21Supplier | | | 100 | | | | | |
| PART26Supplier | | | | | | | | |
| PART31Supplier | | | | | | | | |
| PART36Supplier | | | | | 100 | | | |
| PART17Supplier | | | | | | | 100 | 500 |
| PART22Supplier | | | 100 | | | | | |
| PART27Supplier | | 100 | | | | | 100 | |
| PART32Supplier | | | | | | | | |
| PART37Supplier | | | | | | | | |
| PART18Supplier | | | 100 | | 100 | | | 100 |
| PART23Supplier | | | | | | | | |
| PART28Supplier | | 100 | | | | 100 | | 500 |

FIG. 14

DEMAND-DRIVEN COLLABORATIVE SCHEDULING FOR JUST-IN-TIME MANUFACTURING

TECHNICAL FIELD

This description relates to manufacturing.

BACKGROUND

Manufacturing generally involves the making of items for sale, e.g., by constructing the items from component parts. Once produced, the items are often stored as inventory, e.g., in warehouse facilities, and ultimately shipped to retail stores or directly to consumers.

In scenarios in which a quantity of inventory is produced which exceeds short-term or long-term demand by consumers, the excess inventory may be stored (incurring associated storage costs) and/or sold at reduced prices (with associated reductions in profitability). On the other hand, in scenarios in which the quantity of inventory is insufficient to meet consumer demands, then manufacturers and other providers may lose opportunities to consummate sales, and again may suffer from reduced profitability, as well as from negative effects of customer dissatisfaction on the part of consumers who are unable to receive a desired item in a timely fashion. Moreover, the manufacturer may suffer from losses associated with non-optimal usage of production facilities, such as, e.g., when assembly lines or other manufacturing equipment sit(s) idle and at least temporarily fails to provide a return on investment to the manufacturer.

Therefore, it is desirable to minimize available inventory while still ensuring that customer demands for product availability are met. However, accomplishing this goal is made difficult by a variety of factors, such as, e.g., variations in customer demand, variations in availability of manufacturing facilities, and a need to optimize scheduling of component parts received from part suppliers (particularly when a large number of such suppliers/parts are required to be scheduled). As a result, it may be difficult for a manufacturer to provide items for sale in a manner that optimizes the resources of the manufacturer, while still maintaining a desired level of product availability as experienced by consumers.

SUMMARY

According to one general aspect, a computer system may include instructions recorded on a computer-readable medium and executable by at least one processor. The system may include a schedule manager configured to cause the at least one processor to determine a schedule of each of a plurality of manufacturing resources used to manufacture one or more items, relative to one or more time intervals. The schedule manager may include an input handler configured to determine constraints related to the manufacturing resources and to the one or more items, and a chromosome comparator configured to compare a plurality of schedule chromosomes, each schedule chromosome including a potential schedule of use of the manufacturing resources within the one or more time intervals in producing the one or more items, and configured to compare each of the plurality of schedule chromosomes relative to the constraints, to thereby output a selected subset of the plurality of schedule chromosomes. The schedule manager may include a chromosome combiner configured to combine schedule chromosomes of the selected subset of the plurality of schedule chromosomes to obtain a next generation of schedule chromosomes for output to the chromosome comparator and for subsequent comparison therewith of the next generation of schedule chromosomes with respect to the constraints, as part of an evolutionary loop of the plurality of schedule chromosomes between the chromosome comparator and the chromosome combiner, and a scheduler configured to monitor the evolutionary loop and to select a selected schedule chromosome therefrom for implementation of the schedule based thereon.

Implementations may include one or more of the following features. For example, the constraints may include at least one metric against which the potential schedules are judged, and the schedule manager may include a preference tuner configured to designate the at least one metric. The at least one metric may include a profitability of the one or more items. The at least one metric may include a relative utilization of the manufacturing resources in manufacturing the one or more items.

The manufacturing resources may include one or more of at least one parts production line, at least one assembly line, at least one parts supplier, and at least one warehouse. The schedule manager may include a sales forecaster configured to forecast future sales data for the one or more items based on historical sales data thereof, and the forecasted future sales data may be included in the constraints.

The schedule manager may include a simulation module configured to simulate an effect of the selected schedule over time. The schedule manager may include a what-if module configured to simulate an effect of the selected schedule over time in the presence of selectable variations in the constraints.

The chromosome combiner may be configured to combine the schedule chromosomes including selecting pairs of schedule chromosomes and crossing over portions of each pair to obtain a child chromosome of the next generation. At least a portion of the evolutionary loop may be executed using parallel processes in which each generation of schedule chromosomes is divided into sub-groups for parallel processing thereof. The scheduler may be configured to select the selected schedule chromosome after a pre-determined number of generations of the evolutionary loop, or after determining that the selected chromosome satisfies the constraints to a pre-determined extent.

According to another general aspect, a computer-implemented method, may include defining a schedule of each of a plurality of manufacturing resources used to manufacture one or more items, relative to one or more time intervals, and determining constraints related to the manufacturing resources and to the one or more items. The computer-implemented method may include evaluating a plurality of schedule chromosomes, each schedule chromosome including a potential schedule of use of the manufacturing resources within the one or more time intervals in producing the one or more items, including comparing each of the plurality of schedule chromosomes relative to the constraints. The computer-implemented method may include outputting a selected subset of the evaluated plurality of schedule chromosomes, and combining schedule chromosomes of the selected subset of the plurality of schedule chromosomes to obtain a next generation of schedule chromosomes for subsequent evaluation therewith of the next generation of schedule chromosomes with respect to the constraints, as part of an evolutionary loop of the plurality of schedule chromosomes. A selected schedule chromosome may be selected from the selected subset for implementation of the schedule based thereon.

Implementations may include one or more of the following features. For example, the constraints may include forecasted future sales data based on historical sales data for the one or more items. The selected schedule chromosome may be selected after a pre-determined number of generations of the evolutionary loop, or after a determination that the selected chromosome satisfies the constraints to a pre-determined extent.

According to another general aspect, a computer program product may be tangibly embodied on a computer-readable storage medium and may include instructions. The instructions, when executed by at least one processor, may be configured to define a schedule of each of a plurality of manufacturing resources used to manufacture one or more items, relative to one or more time intervals. The instructions, when executed by the at least one processor, may be configured to determine constraints related to the manufacturing resources and to the one or more items, evaluate a plurality of schedule chromosomes, each schedule chromosome including a potential schedule of use of the manufacturing resources within the one or more time intervals in producing the one or more items, including comparing each of the plurality of schedule chromosomes relative to the constraints, and output a selected subset of the evaluated plurality of schedule chromosomes. The instructions, when executed by the at least one processor, may be configured to combine schedule chromosomes of the selected subset of the plurality of schedule chromosomes to obtain a next generation of schedule chromosomes for subsequent evaluation therewith of the next generation of schedule chromosomes with respect to the constraints, as part of an evolutionary loop of the plurality of schedule chromosomes, and select a selected schedule chromosome from the selected subset for implementation of the schedule based thereon.

Implementations may include one or more of the following features. For example, the constraints may include at least one metric against which the potential schedules are judged, and wherein the at least one metric is received from a user. The constraints may include forecasted future sales data based on historical sales data for the one or more items.

The instructions, when executed, may be configured to simulate an effect of the selected schedule over time. The instructions, when executed, may simulate an effect of the selected schedule over time in the presence of selectable variations in the constraints. The selected schedule chromosome may be selected after a pre-determined number of generations of the evolutionary loop, or after a determination that the selected chromosome satisfies the constraints to a pre-determined extent.

The details of one or more implementations are set forth in the accompanying drawings and the description below. Other features will be apparent from the description and drawings, and from the claims.

BRIEF DESCRIPTION OF THE DRAWINGS

FIG. 3 is a block diagram of an example chromosome for use by the system of FIG. 1.

FIG. 14 is a fifth screenshot illustrating example operations of the system of FIG. 9.

DETAILED DESCRIPTION

Figure 1:
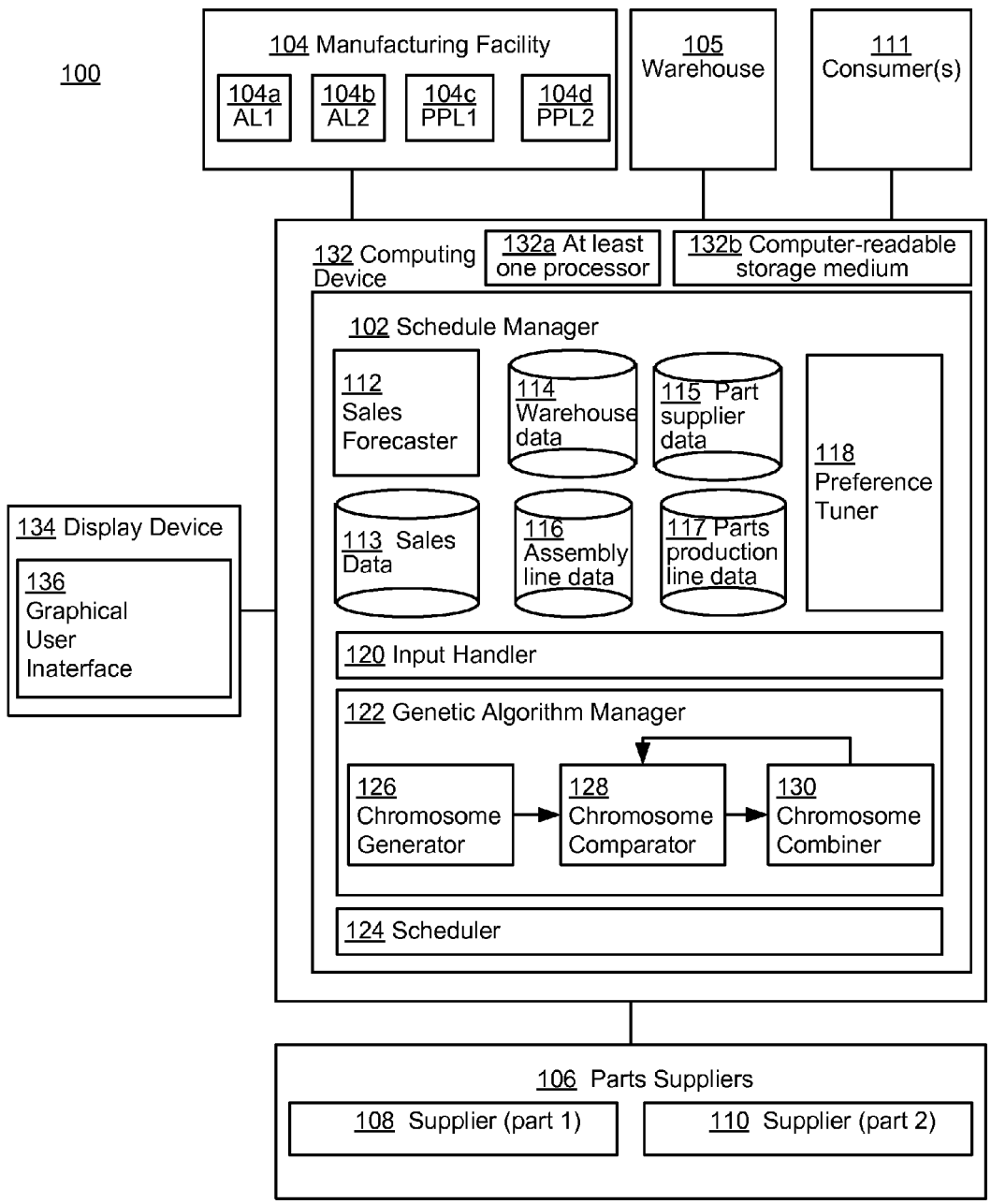
FIG. 1 is a block diagram of a scheduling system for collaborative scheduling for just-in-time manufacturing using a genetic algorithm.

FIG. 1 is a block diagram of a scheduling system for collaborative scheduling for just-in-time manufacturing using a genetic algorithm. In the system 100, a schedule manager 102 is configured to schedule operations of a manufacturing facility 104 with respect to an associated warehouse 105 and with respect to interactions with parts suppliers 106 (where, as shown, a first supplier 108 may provide a first part and a second supplier 110 may supply a second part). More specifically, the schedule manager 102 may be configured to schedule operations of the manufacturing facility 104 in a way that optimizes the resources of the manufacturing facility in a desired manner, while providing a desired level of availability of items/products for sale to consumer 111. Moreover, the schedule manager 102 may achieve these goals in a fast, efficient, repeatable manner, and for widely-ranging examples of numbers, types, and job requirements of various scheduling scenarios.

More specifically, in the examples shown, the manufacturing facility 104 may include a number of manufacturing resources, including, e.g., assembly lines 104a (AL1), 104b (AL1) and parts production lines 104c (PPL1), 104d (PPL2). That is, as is well-known, parts production lines 104c, 104d are often used to produce component parts, while assembly lines 104a, 104b are often used to assemble such components parts, together and/or with parts received from suppliers 106, into retail items for sale. Specifically, for example, along such assembly lines, separate assembly stations may be designated at which a human and/or machine operator performs a repeated assembly task in a highly-specialized and efficient manner, so that the sum total of such assembly tasks results in completion of the item for sale. In a classical example of such assembly lines, and as used in numerous examples described herein, an automobile may be mass-produced by assembling component parts (e.g., frame, windshield, doors, engine, and so on) into a finished automobile.

Thus, such assembly lines are often used to produce items for sale to consumer 111 in a fast, efficient manner. However, many factors may contribute to the potential for sub-optimal use of assembly lines and other manufacturing resources. For example, if the assembly line 104a is designed to produce an item for sale using a first part from supplier 108 and a second part from supplier 110, then the assembly line 104a may unintentionally and undesirably sit idle if the supplier 108 is unable to supply the first part in a timely fashion. Similar comments apply when, e.g., the parts production line 104c is unable to produce a part required by the assembly line 104a. On the other hand, if the assembly line 104a has full availability of all necessary parts, it may occur that an excess number of items for sale may be produced (relative to a demand for such items on the part of consumers 111), so that the excess items must be stored at the warehouse 105 for an undesirably long period of time.

Of course, it may be appreciated that the example assembly lines 104a, 104b and parts production lines 104c, 104d are merely examples of manufacturing facility resources, and that other examples may be used. Similarly, the parts suppliers 106 may be understood to represent various examples of parts suppliers, ranging from, e.g., local wholesalers to providers located in a different country. Nonetheless, as described herein, the schedule manager 102 may accomplish the goal of dealing with these and other obstacles inherent to the manufacturing process, so as to enable just-in-time manufacturing in a manner that enables the operator of the manufacturing facility 104 to accomplish a desired goal of, e.g., maximizing profitability and/or production capacity.

Specifically, as described in detail herein, the schedule manager 102 may utilize historical sales data 113 for an item or type of item to be manufactured, in conjunction with a sales forecaster 112, to provide a predicted level of demand by the consumer(s) 111. Such forecasts may be short-term and/or long-term, and may be made with varying levels of specificity, e.g., with respect to various customer demographics, seasonal variations in sales levels, and various other variables. In specific examples, the sales forecaster 113 may use regression techniques to make sales forecasts.

Further, the schedule manager 102 may use various other types of data 114-117 related to constraints which may be known or thought to influence, control, or otherwise constrain operations of the manufacturing facility 104. Specifically, as shown in the example of FIG. 1, warehouse data 114 may be stored which describes a current, historical, or maximum capacity of the warehouse 105 (which may be understood to represent one or more warehouses), as well as time/cost constraints associated with transporting items thereto (or therefrom). Further, part supplier data 115 may be stored which represents past, present, or predicted data about the parts suppliers 106, such as, e.g., typical delivery times for each part, production capacity of each supplier, and cost information including volume discounts (or other costs discounts) associated with each supplier. Meanwhile, assembly line data 116 and parts production line data 117 may be understood to represent data associated with past, present, or predicted operations (e.g., availability or capacity) of the various assembly lines 104a, 104b and parts production lines 104c, 104d. For example, such data may include a cost(s) in time and money of switching operations of the assembly line 104a from producing a first item for sale (e.g., an first automobile model, such as a car) to producing a second item for sale (e.g., a second automobile model, such as a truck), since such switches are commonly required and may vary widely in the extent to which line operators are required to re-tool or otherwise re-configure the assembly line 104.

Of course, the example data 113-117 are intended merely as non-limiting examples, and additional or alternative types of data may be used in the operations of the scheduling manager 102. For example, data may be stored, e.g., in the assembly line data 116 and/or elsewhere, regarding an extent to which different items to be produced share the same part(s). For example, when automobiles are produced, two different types of cars may use the same braking system and related part(s). Such common usages of parts may, e.g., reduce a cost associated with switching the assembly line 104a from assembling the first car to assembling the second car.

More generally, such constraint data related to manufacturing resources may be understood to relate to, or be defined by, the nature and type of manufacturing facility and/or items being produced in question. For example, the manufacturing facility 104 may not utilize assembly lines, as such, at all, and may instead use, e.g., dedicated work stations at each of which human/machine operators construct an item for sale from start-to-finish. In other examples, the manufacturing facility 104 may conduct testing (e.g., for quality control) on partially or completely finished items for sale. In these and other scenarios and situations, the schedule manager 102 may be instrumental in allocating, i.e., scheduling, all associated manufacturing resources in a period(s) of time, so as to achieve a desired business goal.

In other words, the schedule manager 102 may be configured to select an optimal or near-optimal scheduling solution which defines specific time intervals during which associated manufacturing resources (e.g., assembly lines 104a, 104b, parts production lines 104c, 104d, or parts suppliers 106) should be used to obtain a desired result. For example, a manufacturer may wish to produce certain quantities of three types of items for sale within a three-day period; e.g., may wish to produce fifty each of three different types of cars. Thus, in a simple possible scheduling solution, the manufacturer may decide to produce fifty cars of the first type on the first day, fifty cars of the second type on the second day, and fifty cars of the third type on the third day. Of course, if a part that is used only by the second type of car is delayed by a day in its delivery from a supplier (or in its production from a parts production line), then such a production schedule would suffer from associated delays at the start of the second day, and/or a need to make an unexpected switch to producing the third type of car on the second day.

In another simplified example, the manufacturer may schedule operations quite differently, e.g., by scheduling the assembly line 104a for assembling of the first car during the morning of the first day and the afternoon of the third day, by scheduling the assembly line 104b for assembling of the first car during the morning of the second day and the morning of the third day, and by otherwise interspersing usage of the assembly lines 104a, 104b with respect to the second and third types of cars, as well. Of course, any and all such schedule variations are subject to potential difficulties, and such difficulties, generally speaking, grow exponentially relative to increases in the manufacturing resource constraint data 113-117.

In particular, it may be appreciated that for larger quantities of the data 113-117 (e.g., for larger numbers of assembly lines, parts production lines, suppliers, and so on), the problem of scheduling manufacturing operations expands considerably, since the associated solution space grows in an exponential manner. Nonetheless, the system 100 of FIG. 1 (in particular, the schedule manager 102) provides an optimal or near-optimal scheduling solution, in a way that is fast and efficient. The system 100 also allows simulations of possible scheduling solutions, as well as associated "what-if" scenario modeling that allows the manufacturer or other user to make educated and informed decisions about how to utilize the manufacturing facility 104 and the warehouse 105.

In particular, the system 100 may implement a randomized algorithm approach known as a genetic algorithm (GA), which refers generally to a computer simulation of Darwinian natural selection that iterates through successive generations to converge toward the best solution in the problem/solution space. Such a genetic algorithm is used by the system 100 to incorporate constraint data 113-117 into the scheduling optimization process. Further, the system 100 is capable of proposing "best-available" schedules, even when there is no known solution that matches all of the constraints completely or perfectly.

In the system 100, and in the following description, the above-referenced genetic algorithm approach may be implemented, for example, by creating a "chromosome" representing a possible solution to the problem described above of scheduling operations of the manufacturing facility 104. Specific examples of such schedule chromosomes are provided below and discussed in detail, e.g., with respect to FIGS. 2 and 3. However, generally speaking, it may be appreciated that such schedule chromosomes include particular manufacturing resources and include associated time intervals during which the manufacturing resources are idle or are used to a given extent or in a given manner. Thus, in theory, there may be a single such chromosome that represents the single best scheduling solution for a given set of constraint data 113-117 and associated scheduling objective (e.g., maximizing profit). However, the optimization of the schedule (chromosome) is relative to the accuracy of the constraint data 113-117 and other factors, and due to the nature of the genetic algorithms used herein, the schedule manager 102 may find a solution that is very close to the optimal solution, even if the actual optimal solution can not be identified as such.

In this regard, and as referenced above, the schedule manager 102 may be configured to optimize scheduling operations relative to one or more objectives. One such metric may include profitability. For example, some items for sale may be more profitable than others, and/or profitability may be enhanced by attempting to match production and demand as closely as possible (so as to minimize or eliminate use of the warehouse 105), or by otherwise exhibiting a preference for behaviors associated with increased profitability. On the other hand, the manufacturer may find value in additional or alternative metrics besides pure profitability. For example, the manufacturer may wish to produce a particular item(s) as quickly as possible, or as a "loss leader," or to compete with a particular item sold by a competitor. In other examples, the manufacturer may wish to gain a certain level of market share, or may wish to maximize utilization of manufacturing resources (even at a cost to profitability), e.g., in order to avoid lay-offs or other down time for manufacturing employees.

A preference tuner 118 is thus illustrated which may be used to provide such designations between possible objectives of the schedule manager 102. In this regard, it may be appreciated that various constraints associated with the constraint data 113-117 may be considered to be required or optional. For example, in scenarios in which profitability should be maximized, then full utilization may be an option but not a requirement. Thus, the preference tuner 118 may be used to explicitly or implicitly identify and enforce such differences in schedule constraints.

In the schedule manager 102, an input handler 120 may be configured to determine some or all of (relevant portions of) the data 113-117, as well as the associated preferences from the preference tuner 118. Then, a genetic algorithm manager 122 may be configured to use the received inputs to create a plurality of chromosomes representing possible schedule solutions, where such possible solutions may be evaluated against, e.g., the constraint data 113-117 and relative to the designated preferences of the preference tuner 118.

According to a genetic algorithm, the best of these evaluated chromosomes may be "reproduced" to create a new generation or population of chromosomes, which may then themselves by evaluated so that a subset thereof may be selected for a further reproduction and subsequent evaluation. In this way, each generation/population of chromosomes will tend to converge toward an optimal solution for scheduling operations of the manufacturing facility 104. Ultimately, a scheduler 124 may be used to select a particular one of the schedule solutions (chromosomes) for use in scheduling an actual usage(s) of the assembly lines 104a, 104b and the parts production lines 104c, 104d relative to the parts suppliers 106.

More specifically, as shown, the genetic algorithm manager 120 may include a chromosome generator 124 configured to generate schedule chromosomes. Such generation may occur at random, or may include some initial guidelines or restrictions with respect to placing or not a particular scheduling may occur. Of course, as described above, larger numbers of manufacturing resources and parts/suppliers cause the available pool of chromosomes to grow exponentially, so that it becomes difficult or impossible to generate, much less evaluate, all possible combinations (chromosomes).

Therefore, rather than attempt to generate and evaluate all possible solutions, the chromosome generator 126 generates an initial population or set of chromosomes, which are then evaluated by a chromosome comparator 128, which may be configured to compare the population of chromosomes based on compliance with the constraint data 113-117 and relative to the preferences received from the preference tuner 118, to thereby output a selected subset of the plurality of chromosomes, which represent the best available schedules. Details and examples of the comparison and evaluation processes of the chromosome comparator 128 are provided below.

Then, a chromosome combiner 130 may receive the selected subset of the plurality of chromosomes and may be configured to combine (e.g., crossover and mutate) chromosomes of the selected subset of the plurality of chromosomes to obtain a next generation (population) of chromosomes for output to the chromosome comparator 128, which may then perform another, subsequent comparison therewith of the next generation of chromosomes with respect to the inputs of the input handler 120, including, e.g., the inputs 113-118, as part of an evolutionary loop of successive generations of the plurality of chromosomes between the chromosome comparator 128 and the chromosome combiner 130. With each successive generation, the new population of chromosomes represents or includes possible improved or (near-)optimal schedule(s). New generations/populations may thus be iteratively created until either an optimal solution is met, or until constraints/preferences are met up to some pre-defined satisfactory level, or until a pre-determined number of generations is calculated, or until time runs out to compute new generations/populations (at which point a best solution of the current generation may be selected).

As referenced above, the scheduler 124 may be configured to monitor the evolutionary loop and to select a selected chromosome therefrom for implementation of the scheduling based thereon. As just referenced, the selected chromosome/solution may represent either the best (optimal) solution, or may represent a best-available solution. Thus, the scheduler 124 may be tasked with determining whether, when, and how to interrupt or otherwise end the evolutionary loop and extract the best or best-available solution. Then, the scheduler 124 may output the selected chromosome and/or execute the actual scheduling of associated manufacturing operations.

In FIG. 1, it may be appreciated that the system 100 is illustrated using various functional blocks or modules representing more-or-less discrete functionality. Such illustration is provided for clarity and convenience, but it may be appreciated that the various functionalities may overlap or be combined within a described module(s), and/or may be implemented by one or more module(s) not specifically illustrated in FIG. 1. Of course, conventional functionality that may be useful to the system 100 of FIG. 1 may be included as well. Such conventional elements are not illustrated explicitly, for the sake of clarity and convenience.

As shown, the system 100 may be associated with a computing device 132, thereby transforming the computing device 132 into a special purpose machine designed to determine and implement the schedule process(es) as described herein. In this sense, it may be appreciated that the computing device 132 may include any standard element(s), including at least one processor(s) 132a, memory (e.g., non-transitory computer-readable storage medium) 132b, power, peripherals, and other computing elements not specifically shown in FIG. 1. The system 100 also may be associated with a display device 134 (e.g., a monitor or other display) that may be used to provide a graphical user interface (GUI) 136. The GUI 136 may be used, for example, to receive preferences using the preference tuner 118, to input or modify the constraints 113-117, or to otherwise manage or utilize the system 100. Other elements of the system 100 that would be useful to implement the system 100 may be added or included, as would be apparent to one of ordinary skill in the art.

Figure 2:
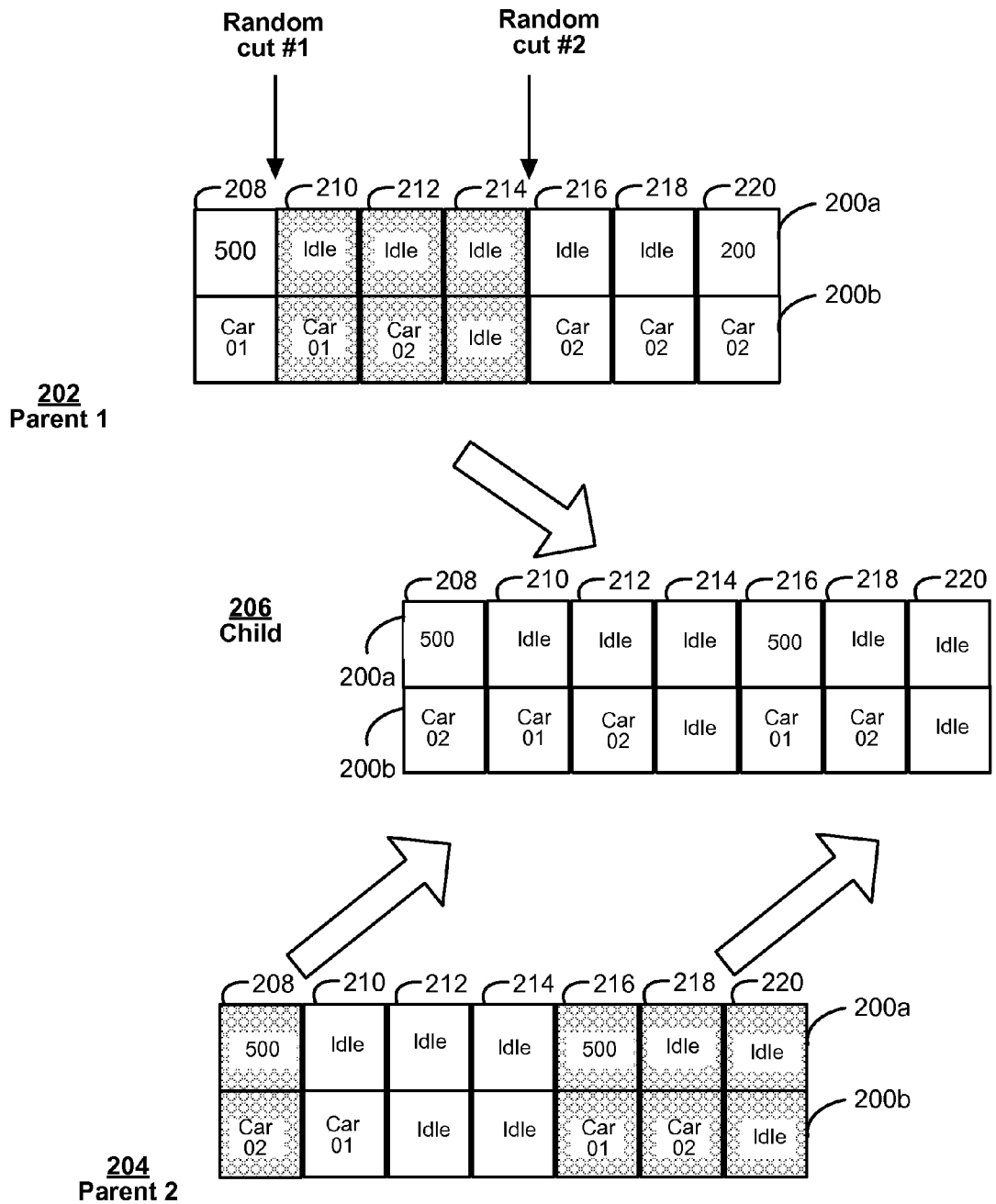
FIG. 2 is a block diagram illustrating an example combination of chromosomes used in the genetic algorithm of the system of FIG. 1.

FIG. 2 is a block diagram illustrating an example combination of chromosomes 202, 204 used in the system of FIG. 1. That is, chromosomes 202, 204 may be a pair of a plurality or population of schedule chromosomes determined by the chromosome comparator 128 which are output to the chromosome combiner 130, as described herein. Such pairs of chromosomes may be input to the chromosome combiner 130 and then combined in the role of parent chromosomes to execute a simulation of sexual crossover to obtain a new child chromosome 206, which, as described above, is thus part of a new generation of chromosomes which may be input back into the chromosome comparator 128 with other members of the same generation as part of an evolutionary loop to optimize the scheduling process. Thus, the genetic algorithm manager 122 provides a genetic algorithm as a computer simulation of Darwinian natural selection that iterates through various generations to converge toward the best solution in the problem space.

In the example of FIG. 2, the given example is directed to the manufacture of cars (specifically, a first type of car illustrated as "Car 01" and a second type of car illustrated as "Car 02"). In the example, both car types may be built using a particular part. Of course, this is a simplified example for the sake of illustration. FIG. 3, below, provides a more detailed, but still simplified, example in a similar context.

In FIG. 2, the chromosomes 202-206 each are represented as part of an array of size T=7 (with time intervals being labeled 208-220). Row 200a represents a supplier (e.g., the supplier 108 supplying a first part), while a row 200b represents an assembly line (e.g., the assembly line 104a). Thu, in time interval 208, in the possible schedule of the chromosome 202, the assembly line 104a may be operated using 500 of the supplied parts to help construct the first car, Car 01. In time interval 210, the assembly line 104a continues to be used to construct the first car, Car 01, but without using any of the parts supplied by the supplier 108 (of course, other parts may be used with respect to the first car at the assembly line 104a, although not shown in FIG. 2 for simplicity). At time 212, the assembly line 104a switches to the second car, Car 02, but again is idle with respect to the part from the supplier 108. In time interval 214, both the assembly line and the part supplier are assumed to be idle. Similar comments apply to further characterizations of the time intervals 216-220 of the parent chromosome 202 and to the parent chromosome 204.

FIG. 2 further illustrates the concept of genetic recombination as executed in the genetic algorithm manager 122. In FIG. 2, FIG. 2 shows a recombination of chromosomes applied to the two parents 202, 204 by the chromosome combiner 130 to produce the new child chromosome 206, using a two-point crossover scheme. Using this approach, a randomly chosen contiguous subsection of the first parent 202 (defined by random cuts 1 and 2) is copied to the child 206, and then all remaining items in the second parent 204 are added that have not already been taken from the first parent's subsection. In FIG. 2, the portions of the parent chromosomes 202, 204 defined by the random cuts 1 and 2 are illustrated as hashed and indicated by corresponding arrows as being combined within the child chromosome 206, maintaining the order of appearance as in the parents.

Such a combination is but one example of possible recombination techniques. In general, it may be appreciated from known characteristics of genetic algorithms that parent chromosomes may recombine to produce children chromosome, simulating sexual crossover, and occasionally a mutation may be caused to arise within the child chromosome(s) which will produce new characteristics that were not available in either parent. Such mutations may be generated at random, or according to a pre-defined technique, by the chromosome combiner 130. More detailed examples of cross-over and mutation are provided below, e.g., with respect to FIG. 8.

The children chromosomes may then be passed back to the chromosome comparator 126, which, as described, may be configured to evaluate and then rank the children chromosome, and thereafter to select the best subset of the children chromosomes to be the parent chromosomes of the next generation, thereby, again, simulating natural selection. The generational or evolutionary loop may end, e.g., after some optimal condition is met, or after some stopping condition is met. As an example of the latter, the scheduler 124 may be configured to monitor the genetic algorithm manager 122 and to end the evolutionary loop after 100 generations have passed, or until the genetic algorithm manager 122 fails to produce a better solution after a pre-set number of generations.

To compare and evaluate the chromosomes, the chromosome comparator 128 may implement an evaluation function which incorporates or reflects, e.g., the constraint data 113-117 and preferences of the preference tuner 118. The evaluation function may be applied to obtain a total score(s) for each chromosome, which may then be used to select the best subset of children chromosomes to be the parent chromosomes of the next generation. Specific examples of the evaluation function are provided in more detail, below, e.g., with respect to FIG. 7.

FIG. 3 is a block diagram of a more detailed example of a schedule chromosome 300 that may be used by the genetic algorithm manager 122 of FIG. 1. As shown in FIG. 3, the schedule chromosome 300 may include a plurality of time intervals 302 which are common to parts production lines 304, parts suppliers 306, and assembly lines 308. In other words, as generally described above with respect to FIG. 2, the chromosome 300 of FIG. 3 represents a potential scheduling of operations of the manufacturing facility 104, with respect to a manner in which the parts production lines 304, the parts suppliers 306, and the assembly lines 308 are scheduled with respect to one another.

In the specific example of FIG. 3, as shown, parts production lines 304 are illustrated as including lines 1-3, each of which, during any particular time interval of the time intervals 302, may be engaged in the production of various parts (illustrated in the example of FIG. 3 as, e.g., part 01, part 02, part 11, part 12, part 21, and part 22). In other time intervals of the time intervals 302, as shown, and as referenced above with respect to FIG. 2, one or more of the parts production lines 304 may be idle.

Similarly, within the time intervals 302, the parts suppliers 306 are illustrated as including parts received from suppliers 1-3. For example, as shown, in a given time interval, a quantity (e.g., 200, 500, 1000) of one or more types of parts may be ordered and/or received from a corresponding one of the parts suppliers 306. As shown, in many of the time intervals 302, no parts may be ordered/received from a given one of the parts suppliers 306, so that the corresponding supplier may be considered to be idle during such a time interval.

Still further in FIG. 3, assembly lines 308 are illustrated as including assembly lines 1, 2. Analogously to the parts production lines 304, the assembly lines 308 are illustrated as being dedicated to the assembly of one of a plurality of possible car types that are eligible for scheduling within the time intervals 302. Specifically, as shown, the assembly lines 308 may be used to manufacture portions of two or more cars (illustrated in the example of FIG. 3 as car 01, car 02). Also similarly to the examples above, the assembly lines 308 may be understood to be idle during a given one of the time intervals 302, as shown.

Thus, the schedule chromosome 300 of FIG. 3 represents a detailed example of a potential chromosome that may be used by the system 100, and that may be used to attempt to optimize the scheduling of operations of the manufacturing facility 104. The example scenario of automobile production by the manufacturing facility 104 is provided and expanded upon in detail, below, using the example schedule chromosome 300 of FIG. 3. Of course, as described herein, the system 100 may be understood to be implementable in the context of virtually any scheduling operations of any type of manufacturing facility 104, as would be apparent to one of skill in the art.

Figure 4:
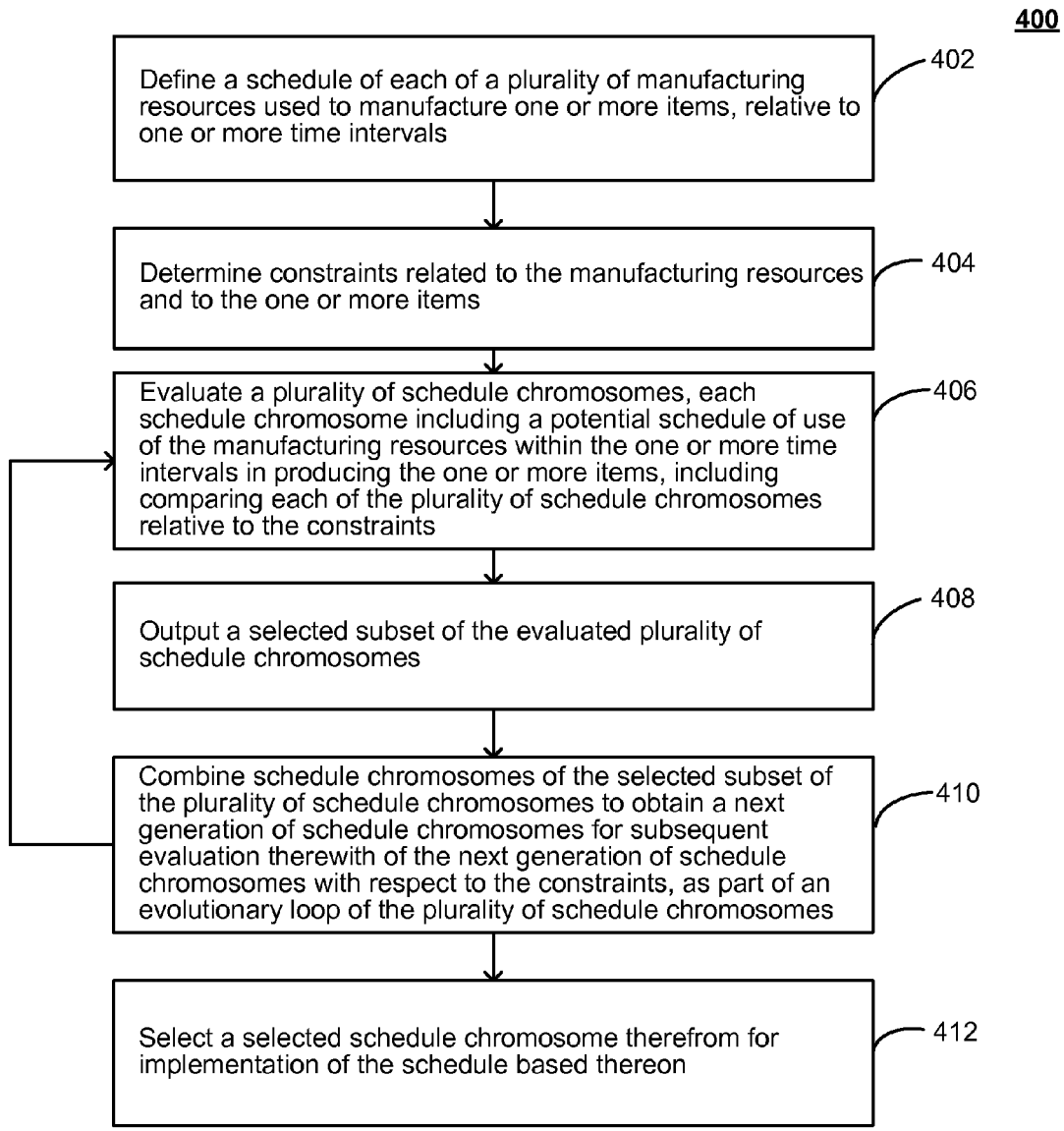
FIG. 4 is a flowchart illustrating example operations of the system of FIG. 1.

FIG. 4 is a flowchart 400 illustrating example operations 402-412 of the system 100 of FIG. 1. In the example of FIG. 4, operations 402-412 are illustrated as separate, sequential operations. However, it would be appreciated that two or more of the operations 402-412 may be conducted in a partially or completely overlapping or parallel manner. Moreover, the operations 402-412 may be implemented in a different order than that shown, and, moreover, it will be appreciated that additional or alternative operations, not specifically illustrated in the example of FIG. 4, may be included, and one or more of the operations 402-412 may be omitted. Still further, as illustrated with respect to the operations 406-410, various ones of the operations 402-412 may be implemented in an iterative, looped, or nested fashion, or otherwise may be implemented in an order and manner consistent with obtaining a desired scheduling result from the system 100 of FIG. 1.

In the example of FIG. 4, a schedule of each of a plurality of manufacturing resources used to manufacture one or more items, relative to one or more time intervals, may be defined (402). For example, the schedule manager 102 may be configured to define such a schedule for operations of manufacturing resources (e.g., assembly lines 104A, 104B, parts production lines 104C, 104D, or parts suppliers 106) in association with production of items for sale to consumers 111.

Constraints related to the manufacturing resources and to the one or more items may be determined (404). For example, the input handler 120, perhaps at a direction of the user of the system 100 by way of the GUI 136, may determine constraint data 113-117 (or portions thereof), where, as described herein, (e.g., with respect to FIG. 1), it may be appreciated that the various types of constraint data 113-117 may be related to, or may describe, past, present, or future usages of the various related manufacturing resources and/or items for sale.

A plurality of schedule chromosomes may be evaluated, each schedule chromosome including a potential schedule of use of the manufacturing resources within the one or more time intervals in producing one or more items, including a comparison of each of the plurality of schedule chromosomes relative to the constraints (406). For example, as described above with respect to FIG. 1, and as described in detail below, e.g., with respect to FIGS. 5-7, the chromosome generator 126 may output an initial population of chromosomes, such as the chromosome 300 and variations thereof, so that the chromosome comparator 128 may evaluate the thus-produced chromosome population. Specific techniques for evaluating the chromosome population relative to the constraint data 113-117 are provided in detail below. However, it may be generally appreciated that the chromosome comparator 128 may be configured to select or otherwise identify a subset of a chromosome population received from the chromosome generator 126 (or, later, from the chromosome combiner 130, as described below), so as to determine a pool of chromosomes (i.e., potential schedules) which are likely to be optimal with respect to the remainder of the chromosome population in achieving a desired scheduling goal (e.g., maximum profitability, maximized use of manufacturing resources, or combinations thereof), where, as described, such objectives may be defined by way of the preference tuner 118.

Thus, a selected subset of evaluated plurality of schedule chromosomes may be output (408). For example, the chromosome comparator 128 may output the selected subset to the chromosome combiner 130.

Schedule chromosomes of the selected subset of the plurality of schedule chromosomes may be combined to obtain a next generation of schedule chromosomes for subsequent evaluation therewith of the next generation of schedule chromosomes with respect to the constraints, as part of an evolutionary loop of the plurality of schedule chromosomes (410). For example, the chromosome combiner 130 may execute the types of crossover operations generally referenced above with respect to FIG. 2. Variations of operations of the chromosome combiner 130 are provided in detail below, e.g., with respect to FIGS. 6 and 8.

A selected schedule chromosome may be selected from the selected subset for implementation of the schedule based thereon (412). For example, the scheduler 124 may be configured to monitor operations of the genetic algorithm manager 122, and, in particular, of the evolutionary loop of the chromosome comparator 128 and the chromosome combiner 130, so as to identify the selected schedule chromosome for subsequent usage of the operational schedule defined therein. For example, as described herein, the scheduler 124 may identify the selected chromosome after a certain number of evolutionary loops (i.e., after a certain number of generations), or after a certain level of result is reached, and/or after a certain time period has passed.

Figure 5:
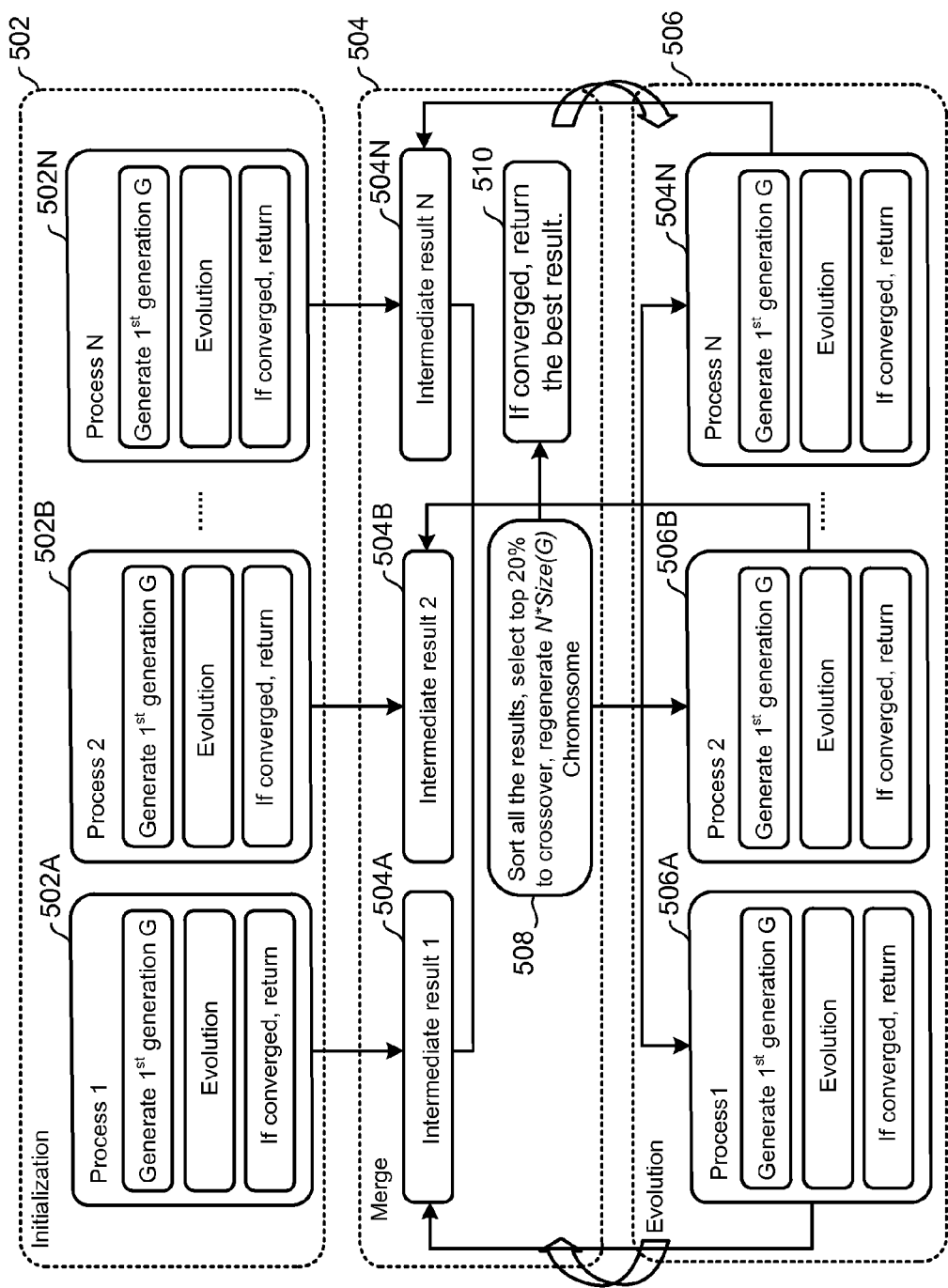
FIG. 5 is a block diagram of an architecture for implementing the system of FIG. 1 using parallel processing.

FIG. 5 is a block diagram of a framework 500 for implementing the system 100 of FIG. 1 in a manner consistent with the operations of the flowchart 400 of FIG. 4. In particular, as shown and described, the framework 500 illustrates a parallel framework in which the various operations of the genetic algorithm manager 122 and the scheduler 124 are parallelized in order to obtain faster, more efficient results.

In this regard, it is known to utilize two, three, or more processors to divide tasks of a larger computational task, so as to obtain computational results in a faster, more efficient manner. In general, such parallelization is known to include a division of the subtasks to be executed in parallel among a specified number of processors, whereupon independent, parallel processing of the assigned subtasks may proceed, until such time as it may be necessary or desired to rejoin or otherwise combine results of the parallel threads of computation into a unified intermediate or final result for the computational task as a whole.

In this regard, it may be appreciated that such parallelization may be implemented using any multi-computing platform in which a plurality of processors, central processing units (CPUs), or other processing resources are available, including network/device clusters. For example, such parallel processing may utilize existing SMP/CMP (Symmetrical Multi-Processing/Chip-level Multi-Processing) servers. Thus, in the present description, it should be appreciated that the described processes may each be executed using such a corresponding unit(s) of processing power within any such environment in which multiple processing options are available. Consequently, for example, it may be appreciated that the at least one processor 132A of FIG. 1 may be understood to represent any two or more of the above-referenced implementations for executing parallel processing, or other platforms for parallel processing, as would be apparent.

In the example of FIG. 5, then, an initialization stage 502 is illustrated in which "N" processes 502A, 502B, . . . 502N are illustrated. As illustrated, each process 502A-502N represents a separate instance of the above-described evolutionary loop of the genetic algorithm manager 122. Specifically, as shown in each of the processes 502A-502N, a generation "G" of chromosomes may be generated, whereupon evolution of subsequent generations of chromosomes may be conducted, until such time as if and when the scheduler 124 may identify a desired type and extent of convergence. As may be appreciated, the chromosome generations of the initial processes 502A-502N may be generated in random fashion. In other example implementations, however, the initial populations may be generated using one or more techniques designed to provide at least a high level of design which attempts to optimize associated schedules, or at least to eliminate inclusion of unworkable or otherwise undesirable potential schedules.

In a subsequent merge stage 504, intermediate results 504A, 504B . . . 504N may be combined, so that, in an operation 508, the combined results may be sorted, and the top 20% (or other designated portion) may be selected for use in creating a subsequent generation of chromosomes. Specifically, as referenced above, and described below in more detail with respect to FIG. 8, the selected portion of a current generation of chromosomes may be utilized to perform the types of crossovers illustrated above with respect to FIG. 2, or other known types of crossovers.

In the example of FIG. 5, and in the examples below, individual pairs of chromosomes may be crossed over multiple times, e.g., such that a subsequent generation of chromosomes includes N*size (G) chromosomes, i.e., includes a same number of chromosomes as a current generation. For example, in the example of FIG. 5, since the top 20% of sorted chromosomes are selected, then each pair of chromosomes may be utilized to generate five new child chromosomes, so as to maintain a same number of chromosomes in each generation.

If the overall operation is designated as having converged in conjunction with the operation 508, then the best result, i.e., the chromosome representing the best schedule according to the designated metric of profit maximum and/or utilization maximization, may be returned, as shown in operation 510. Otherwise, an evolution operation 506 may proceed with a re-parallelization of the new, child chromosome population generated in the operation 508.

Specifically, as shown, processes 506A, 506B . . . 506N may execute a new, current iteration of processing of the generated population chromosomes, in a manner that is substantially identical to the processes 502A, 502B . . . 502N described above with respect to the initialization operations 502. Subsequently, as described above, intermediate results 504A, 504B . . . 504N corresponding respectively to the processes 506A, 506B . . . 506N may be merged for subsequent sorting, crossover, and regeneration in the context of the operation 508, as described above. As may be appreciated, the operations 502, 504, 506 may proceed until convergence is reached at operation 510, and a best or best available result is obtained.

Figure 6:
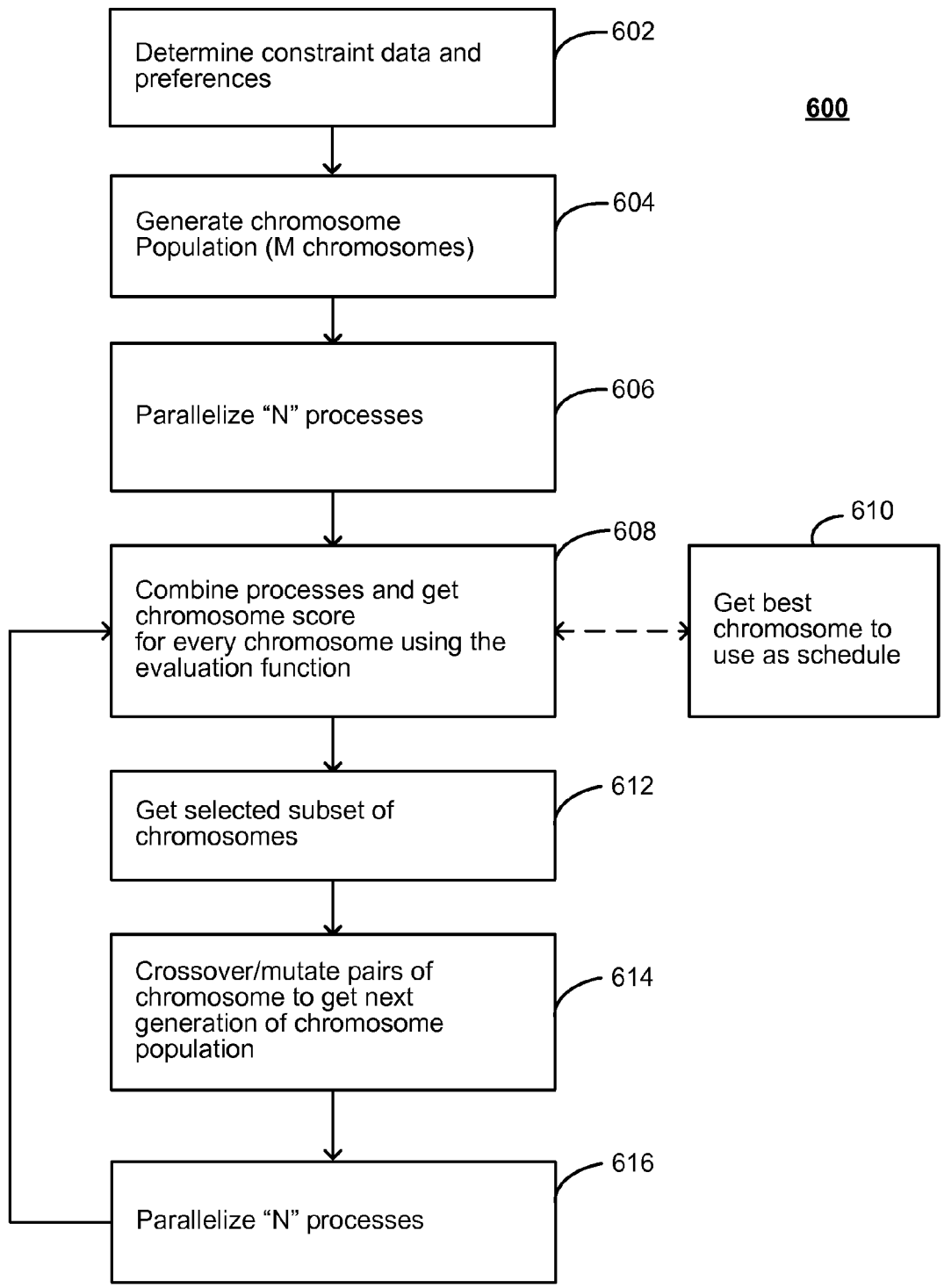
FIG. 6 is a first flowchart illustrating example operations of the system of FIGS. 1 and 5.

FIG. 6 is a flowchart 600 illustrating operations of the framework 500 of FIG. 5, as in more detailed example operations of the system 100 of FIG. 1. In the example of FIG. 6, as well as with respect to subsequent FIGS. 7 and 8, operations of the system 100 and/or the framework 500, and, specifically, operations of the genetic algorithm manager 122 of FIG. 1, are described with respect to the example pseudo code set forth below as pseudo code portions 1-6.

Specifically, as may be appreciated from the above descriptions of FIGS. 1-6, operations of the flowchart 600 may begin with a determination of relevant constraint data and associated preferences (602). For example, the constraint data 113-117 characterizing the various portions of the chromosomes to be constructed and/or against which viability of the chromosomes may be judged, as well as a user's preference for performing such judgments, (e.g., profit maximization or utilization maximization of resources) may be determined. For example, as described, the user of system 100 of FIG. 1 may utilize the GUI 136 to identify, designate, provide, or otherwise determine such information.

An initial chromosome population of "M" chromosomes may be generated (604). For example, the chromosome generator 126 may generate the first generation G of the processes 502A, 502B . . . 502N of FIG. 5.

"N" processes may be parallelized (606). FIG. 5, as described above, illustrates an example of parallelization of "N" processes, e.g., in the initialization stage 502.

A chromosome score for every chromosome of the generation may be obtained, by combining the various processes and using an appropriate evaluation function (608). For example, the chromosome comparator 128 may utilize such an evaluation function to associate a score with each chromosome of the generation. If convergence is reached according to one or more pre-designated criteria, then the best available chromosome may be selected for use of the associated schedule (610). For example, if a chromosome receives a sufficiently high score, or if overall operations of the flowchart 600 have provided a designated number of generations of chromosomes and/or have taken a designated total amount of time, then convergence may be understood to have occurred.

Otherwise, a selected subset of chromosomes may be selected (612). For example, the chromosome comparator 128 may select the top 20% of chromosomes as scored by the evaluation function. Techniques for selecting the selected subset are described below with respect to FIG. 7 and the associated evaluation function.

Then, pairs of the selected chromosomes may be subjected to crossovers/mutation in order to obtain a subsequent generation of chromosomes (614). For example, the chromosome combiner 130 may implement the type of crossovers or combinations described above with respect to FIG. 2, and described in more detail, specific examples below with respect to FIG. 8.

Then, parallelization of a subsequent "N" processes may proceed (616). For example, the chromosome comparator 128 may parallelize the end processes 506A, 506B . . . 506N as part of the evolution operation 506. In this way, as illustrated in FIG. 6 and described above with respect to FIG. 5, a number of generations of chromosomes may be provided, until a suitable chromosome is obtained (610).

With respect to FIG. 6, pseudo code portion 1 illustrates an example chromosome structure, generally corresponding to the example of FIG. 3 above. As may be appreciated, the chromosome structure may include constraint data related, for example, to a number of parts production pipelines, parts suppliers, assembly lines, as well as a number of time intervals to be associated with the relevant pipelines and other production/manufacturing operations.

| Pseudo code Portion 1 |
| --- |
| % Chromosome structure |
| % numOfPartsProductionLines: the number of parts production pipelines |
| % numOfPartsSuppliers: the number of parts suppliers |
| % numOfAssemblyLines: the number of assembly lines |
| % numOfTimeInterval: the number of time intervals pipelines has |
| Structure Chromosome |
| { |
|   int PartsProductionLines [numOfPartsProductionLines][numOfTimeInterval]; |
|   int PartsSuppliers [numOfPartsSuppliers][numOfTimeInterval]; |
|   int AssemblyLines [numOfAssemblyLines][numOfTimeInterval]; |
| } |

Further with respect to FIG. 6, pseudo code portion 2 illustrates the overall process of the genetic algorithm manager 122 for the defined "N" number of parallel processes using generations of M chromosomes. As referenced above with respect to FIG. 6, and as illustrated in the pseudo code portion 2, associated operations include the generation of valid chromosomes, the parallelization of associated processes, on each of which associated evolution and evaluation functions may be performed. As further shown, the pseudo code portion 2 also generally illustrates the crossover/mutation operations associated with regenerating a next generation of M chromosomes.

| Pseudo code Portion 2 | |
| --- | --- |
| | % Parallel Genetic Algorithm |
| | % M: the number of chromosomes each generation has |
| | % N: the number of processes used |
| | % Chromosomes: one generation, which is an array with M chromosomes |
| 1. | FUNCTION PARALLEL_GA |
| 2. | BEGIN |
| 3. |   Generate M random valid Chromosomes |
| 4. |   WHILE NOT CONVERGED |
| 5. |     Allocate them to N processes equally |
| 6. |     ON EACH Process: (Parallel) |
| 7. |       CALL FUNCTION EVOLUTION; |
| 8. |       IF converged, RETURN M/N intermediate result |
| 9. |     Merge and get new generation Chromosomes[M]$_{new}$ |
| 10. |     FOR i := 0 to M−1 DO |
| 11. |       CALL FUNCTION EVALUATE(Chromosomes[i]) |
| 12. |     END FOR |
| 13. |     Sort(Chromosomes) |
| 14. |     Select top 20%, and Re-generate M Child Chromosomes |
| 15. |     % Next Generation |
| 16. |   END WHILE |
| 17. | END |

As described with respect to FIG. 6, and as just illustrated with respect to the pseudo code portion 2, the described genetic algorithm operations may include a specific evolution function which includes a particular evaluation function for evaluating (e.g., providing a score to) each chromosome of a generation. That is, as shown, such an evolution function may be called at line 7 of pseudo code portion 2, including the calling of a corresponding evaluate function at line 11. An example evolution function and is included below in the context of pseudo code portion 3

| Pseudo code Portion 3 | |
| --- | --- |
| | % Evolution |
| 1. | FUNCTION EVOLUTION |
| 2. | BEGIN |
| 3. |   FOR EACH chromosome in current generation |
| 4. |     CALL FUNCTION EVALUATE |
| 5. |     Choose top 20%, crossover and mutate to generate next generation |
| 6. | END |

Portions of pseudo code portion 3 are described below with respect to FIG. 7 and the associated evaluation function shown in pseudo code portion 4. Similarly, the operations of the genetic algorithm of pseudo code portion 2 include the generation or regeneration of a subsequent generation of child chromosomes, which may rely on corresponding crossover and mutation functions, examples of which are provided below with respect to pseudo code portions 5 and 6, and specific aspects of which are illustrated and described below with respect to FIG. 8.

Specifically, in the context of FIG. 7, specific example operations associated with a possible evaluation function are illustrated, and are represented in the example of pseudo portion 4 below. As may be appreciated from the above, the chromosome comparator 128 may be used to implement the evaluation function of FIG. 7.

As shown, evaluation of a given generation of chromosomes may begin with a selection of a particular chromosome to be evaluated (702). In the following examples, the selected chromosome will be evaluated with respect to an overall size of parts (e.g., parts to be produced and/or assembled), as well as with respect to an associated cost (e.g., cost to produce, purchase, and/or assemble). Thus, such size and/or cost scores may be initialized (704), e.g., may be set to zero to begin operations, as shown in lines 3-4 of pseudo code portion 4.

Then, a total size of production parts for a defined time interval of the chromosome may be summed (706). For example, as shown at lines 6-11 of pseudo portion 4, a size of produced parts may be summed into a total size by iterating over the defined number of time intervals. Then, if the summed size is larger than available warehouse space (708), the chromosome being evaluated may be discarded (710).

Otherwise, similarly, a total cost of produced parts may be summed (712). For example, as illustrated in lines 13-18 of pseudo code portion 4, a total cost of produced parts may be obtained, by iterating over the relevant number of time intervals. As described above, and as illustrated in the referenced portion of pseudo code portion 4, the cost may include cost associated with switching between parts production lines.

Subsequently, a total size of parts suppliers for a relevant time interval may be summed (714). For example, as illustrated in lines 21-26 of pseudo code portion 4, the size of shipped parts may be summed into a corresponding total size by iterating over a corresponding number of time intervals. Then, as above, if the summed size is larger than available warehouse space (716), the chromosome being evaluated may be discarded (718).

A total cost of supplied parts may be summed (718). For example, lines 28-31 of pseudo code portion 4 illustrate the summing of a total cost of supplied parts including iterating over the relevant number of time intervals.

A total size of assembly line products for the relevant time interval may be summed (720). For example, as shown in lines 34-41 of pseudo code portion 4, in the specific example of assembling automobiles, a size of produced cars may be summed into a total size by iterating over the relevant number of time intervals. Again, if the total size is larger than warehouse capacity (722), then the evaluated chromosome may be discarded (724).

Otherwise, a type or extent of dependency of parts may be considered (726). For example, as referred to above, and as described in more detail below, certain items being manufactured, (e.g., cars) may include various different model types which may share the use of certain component parts. Such sharing of component parts may have a positive effect on scheduling assembly line usage, since such sharing may reduce an extent to which component parts may need to be moved or otherwise handled during the assembly process. Thus, if the dependency criteria are not satisfied (728), then the evaluated chromosome may be discarded (724).

Figure 7:
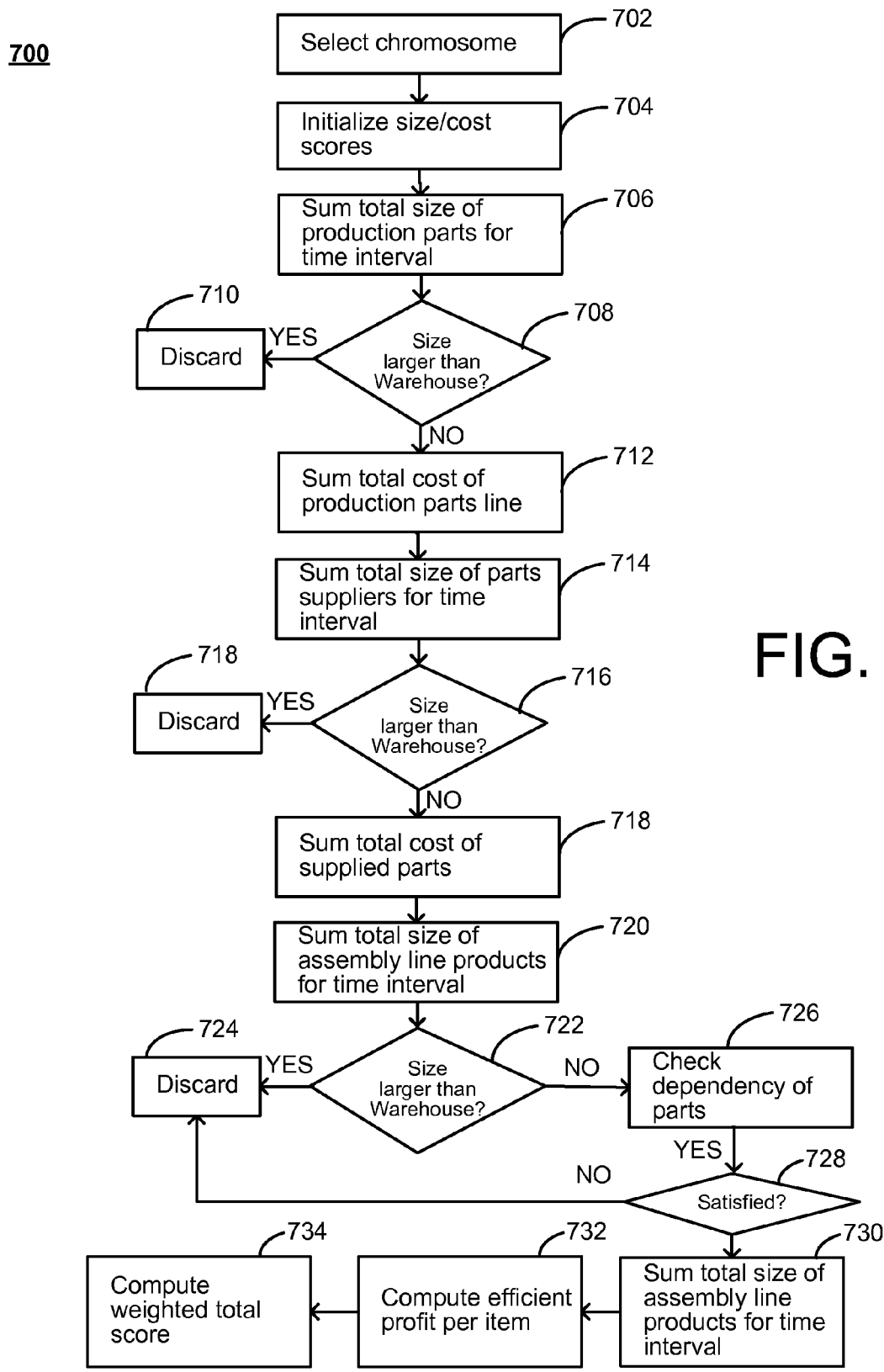
FIG. 7 is a second flowchart illustrating example operations of the system of FIGS. 1 and 5.

Further in FIG. 7, a total cost of the assembly products may be summed (730), as illustrated in lines 43-47 of pseudo code portion 4. Specifically, as shown, the total cost may be obtained by summing the individual assembly cost over the relevant time intervals, where, again, as described above with respect to the parts production lines, and associated switching costs associated with switching products being assembled on a given assembly line may also be computed.

In the example of FIG. 7, an efficient profit per item metric may be obtained (732), so that a total weighted score for the chromosome being evaluated may be computed (734). For example, as shown on lines 50-52 of pseudo code portion 4, a metric for efficient profit per car produced may be obtained based on the forecasted sales data and associated customer demand for the cars in question, as provided by the sales forecaster 112 and associated sales data 113. Then, a profit metric may be calculated based on an overall production value related to the efficient profit per car, and relative to the overall cost. Finally, the total score may be computed using a weighted normalized profit, as illustrated in the example of line 52 of pseudo code portion 4. Of course, in general, with respect to operations 732/734, it may be appreciated that various different metrics for profitability or utilization, or combinations thereof, may be utilized. Thus, as described above with respect to the preference tuner 118 of FIG. 1, a user of the system 100 may modify parameters of the operations 732/734 (e.g., of lines 50-52 of the pseudo code portion 4), or may use an entirely different metric for evaluating each chromosome.

As referenced above, pseudo code portion 4 is provided below:

| Pseudo code portion 4 |
|---|
| % Evaluate |
| 1.   FUNCTION EVALUATE(Chromosome chros) |
| 2.   BEGIN |
| 3.       size_total := 0; |
| 4.       cost_total := 0; |
| 5. |
| 6.       FOR i := 0 to numOfPartsProductionLines DO |
| 7.           % Sum the size of produced parts into total size |
| 8.           FOR j := 0 to numOfTimeInterval DO |
| 9.               size_total += size(chros.PartsProductionLines[i][j]); |
| 10.          END FOR |
| 11.          IF size_total > warehouse THEN RETURN FALSE |
| 12. |
| 13.          % Sum the cost of produced parts into total cost, including switch cost |
| 14.          FOR j := 0 to numOfTimeInterval DO |
| 15.             cost_total += cost(chros.PartsProductionLines[i][j]); |
| 16.             if (chros.PartsProductionLines[i][j] != chros.PartsProductionLines[i][j+1]) |
| 17.                 cost_total -= cost_ProductionLines_switch |
| 18.          END FOR |
| 19.       END FOR |
| 20. |
| 21.       FOR i := 0 to numOfPartsSuppliers DO |

| | Pseudo code portion 4 |
|---|---|
| 22. | % Sum the size of shipped parts into total size |
| 23. | FOR j := 0 to numOfTimeInterval DO |
| 24. | size_total += size(chros. PartsSuppliers[i][j]); |
| 25. | END FOR |
| 26. | IF size_total > warehouse THEN RETURN FALSE |
| 27. | |
| 28. | % Sum the cost of supplied parts into total cost |
| 29. | FOR j := 0 to numOfTimeInterval DO |
| 30. | cost_total += cost(chros. PartsSuppliers[i][j]); |
| 31. | END FOR |
| 32. | END FOR |
| 33. | |
| 34. | FOR i := 0 to numOfAssemblyLines DO |
| 35. | %Sum the size of produced cars into total size |
| 36. | FOR j := 0 to numOfTimeInterval DO |
| 37. | size_total += size(chros. AssemblyLines [i][j]); |
| 38. | Sum the production of cars |
| 39. | END FOR |
| 40. | IF total size > warehouse THEN RETURN FALSE |
| 41. | Check if the dependency of parts is satisfied, IF not RETURN FALSE |
| 42. | |
| 43. | %Sum the cost of assembling cars into total cost, including switch cost |
| 44. | FOR j := 0 to numOfTimeInterval DO |
| 45. | cost_total += cost(chros. AssemblyLines [i][j]); |
| 46. | if (chros. AssemblyLines [i][j] != chros. AssemblyLines [i][j+1]) |
| 47. | cost_total -= cost_AssemblyLines_switch |
| 48. | END FOR |
| 49. | END FOR |
| 50. | Compute efficient profit per car by checking cars' demand |
| 51. | profit = production * efficient profit per car − cost_total |
| 52. | Score = weight * normalized profit + (1 − weight) * normalized production |
| | END |

Figure 8:
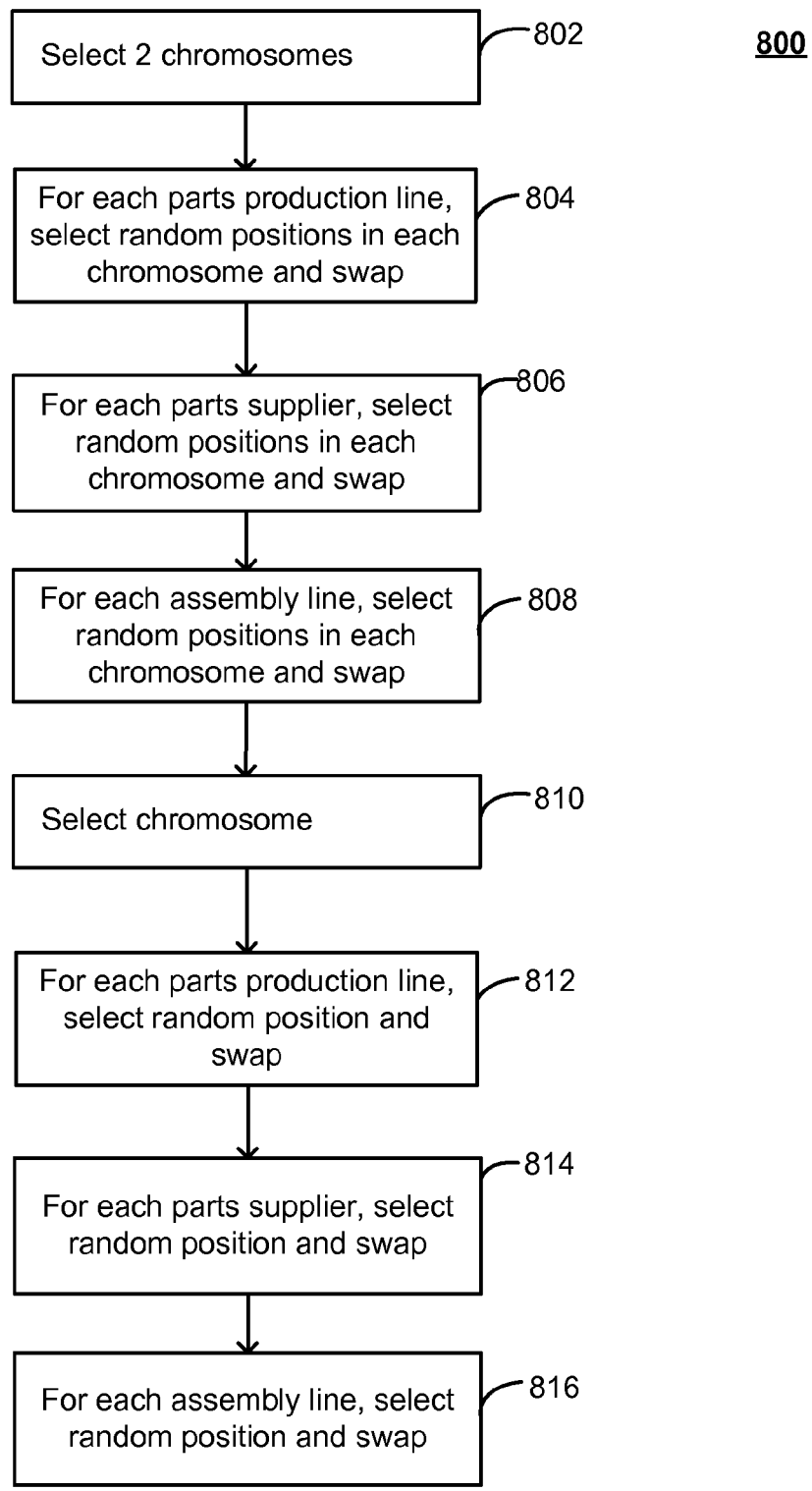
FIG. 8 is a third flowchart illustrating example operations of the system of FIGS. 1 and 5.

As also referenced above, FIG. 8 is a flowchart 800 illustrating example operations related to crossover and mutation operations associated with generating a subsequent generation of chromosomes, such as may be performed by the chromosome combiner 130 of FIG. 1. Specifically, operations 802-808 are illustrated in a specific example in the context of pseudo code portion 5 below, while operations 810-816 are illustrated below in a specific example with respect to the pseudo code portion 6.

Thus, as shown in FIG. 8, operations of the flowchart 800 may begin with selection of two chromosomes to be crossed over (802). For example, with reference to pseudo code portion 5 below, the crossover function may be designated with respect to chromosomes CHR1, CHR2.

Then, as illustrated with respect to lines 2-5 of pseudo code portion 5, for each parts production line, random positions in each chromosome may be selected and swapped (804). Similarly, as shown at lines 7-9 of pseudo code portion 5, for each parts supplier, random positions in each chromosome may be selected and swapped (806). Finally, and again similarly, as shown at lines 12-15 of pseudo code portion 5, for each assembly line, random positions in each chromosome may be selected and swapped (808). In this way, new, crossed over chromosomes CHR1 and CHR2 may be produced.

| | Pseudo Code Portion 5 |
|---|---|
| | % Crossover |
| | % numOfPartsProductionLines: the number of parts production pipelines |
| | % numOfPartsSuppliers: the number of parts suppliers |
| | % numOfAssemblyLines: the number of assembly lines |
| | % numOfTimeInterval: the number of time intervals pipelines has |
| | FUNCTION CROSSOVER (Chromosome Chr1, Chromosome Chr2) |
| 1. | BEGIN |
| 2. | FOR i := 0 to numOfPartsProductionLines DO |
| 3. | Randomly select R positions where the crossover will happen, and denoted by pos[R]. (R< numOfTimeInterval, and 0 ≤ pos[R] ≤ numOfTimeInterval − 1) |
| 4. | Swap the value of Chr1. PartsProductionLines [i][pos[R]] and Chr2. PartsProductionLines[i][pos[R]] |
| 5. | END FOR |
| 6. | |
| 7. | FOR i := 0 to numOfPartsSuppliers DO |
| 8. | Randomly select R positions where the crossover will happen, and denoted by pos[R]. (R< numOfTimeInterval, and 0 ≤ pos[R] ≤ numOfTimeInterval − 1) |
| 9. | Swap the value of Chr1. Parts Suppliers [i][pos[R]] and Chr2. Parts Suppliers [i][pos[R]] |
| 10. | END FOR |
| 11. | |
| 12. | FOR i := 0 to numOfAssemblyLines DO |
| 13. | Randomly select R positions where the crossover will happen, and denoted by pos[R]. (R< numOfTimeInterval, and 0 ≤ pos[R] ≤ numOfTimeInterval − 1) |

| Pseudo Code Portion 5 |
|---|
| 14.        Swap the value of Chr1. AssemblyLines [i][pos[R]] and Chr2. AssemblyLines [i][pos[R]] |
| 15.      END FOR |
| 16.      Return new Chr1 and Chr2 |
| 17. END |

With respect to operations 810-816 and the pseudo code portion 6, an initial chromosome may be selected for mutation (810). Then, as shown in lines 2-6 of pseudo code portion 6, for each parts production line, a random position in the selected chromosome may be selected and replaced with a replacement value (812). In this way, as may be appreciated, such random mutation of chromosomes may be understood to lead to possible improvement and scheduling operations.

Thus, similarly, as shown at lines 9-12 of pseudo code portion 6, for each parts supplier, a random position may be selected and swapped with a new, replacement value (814). Finally, and again similarly, as shown at lines 14-17 of pseudo code portion 6, for each assembly line, a random position in the chromosome may be selected and swapped with a replacement value (816). In this way, as shown at line 18 of pseudo code portion 6, a new, mutated chromosome may be obtained.

Figure 9:
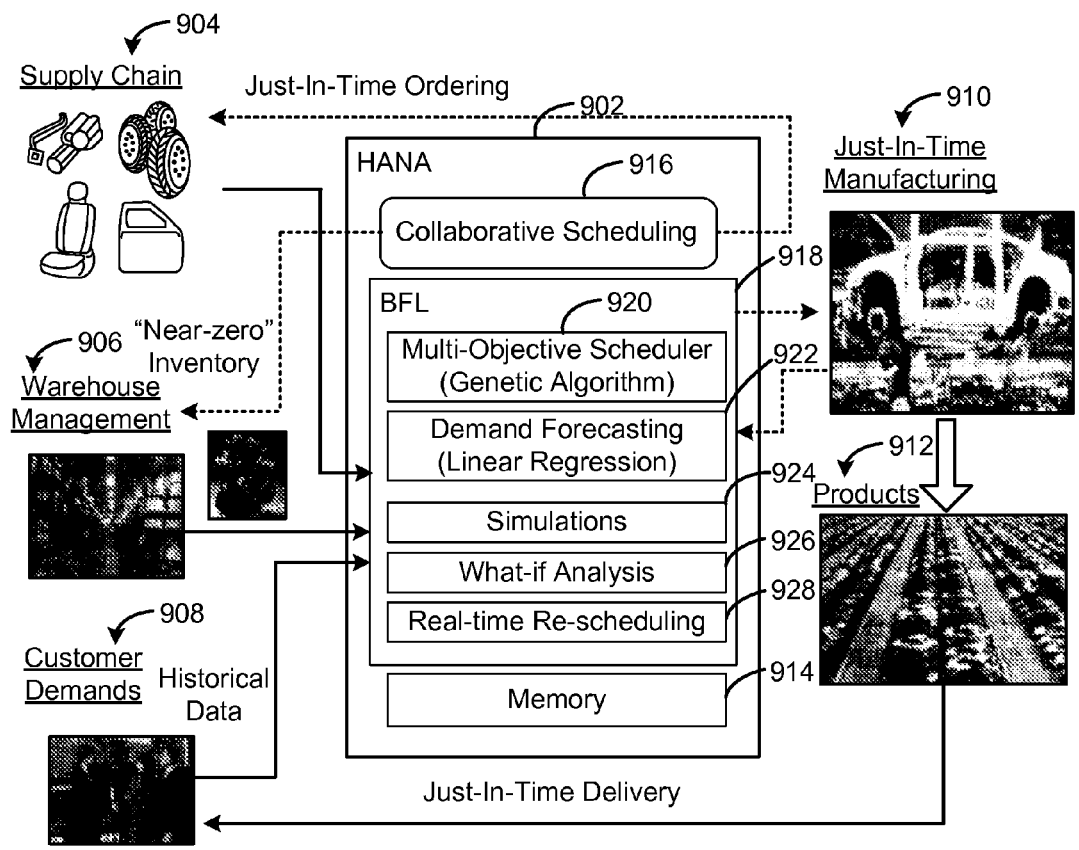
FIG. 9 is a block diagram of an example implementation of the systems of FIGS. 1 and 5.

In the example of FIG. 9, a supply chain 904 is illustrated which represents the various parts suppliers 106 described above. Further, warehouse management 906 illustrates and refers to the warehouse 105 and associated management thereof. Further, customer demands 908 represents sources of the sales data 113, illustrated in FIG. 9 as historical data. Just-in-time manufacturing 910 illustrates a result of the scheduling of the schedule manager 902, so that products 912 ultimately may be produced. In the example, and in the screenshots of FIGS. 10-17 that follow, examples are provided with respect to automobile production. Thus, as illustrated, the various scheduling techniques described herein may enable just-in-time ordering by the manufacturer with respect to the supply chain 904, as well as "near zero" inventory stored using the warehouse management 906, so that,

| Pseudo Code Portion 6 |
|---|
|     % Mutate |
|     % numOfPartsProductionLines: the number of parts production pipelines |
|     % numOfPartsSuppliers: the number of parts suppliers |
|     % numOfAssemblyLines: the number of assembly lines |
|     % numOfTimeInterval: the number of time intervals pipelines has |
|     FUNCTION MUTATE (Chromosome Chr) |
| 1. BEGIN |
| 2.     FOR i := 0 to numOfPartsProductionLines DO |
| 3.         Randomly select R positions where the mutate process will happen, and denoted by pos[R]. (R< numOfTimeInterval, and 0 ≤ pos[R] ≤ numOfTimeInterval − 1) |
| 4.         FOR j:= 0 to pos[R] DO |
| 5.             Randomly select a value from the possible value set to replace the value at PartsProductionLines[i][j] |
| 6.         END FOR |
| 7.     END FOR |
| 8. |
| 9.     FOR i := 0 to numOfPartsSuppliers DO |
| 10.        Random select R positions where the mutate process will happen, and denoted by pos[R]. (R< numOfTimeInterval, and 0 ≤ pos[R] ≤ numOfTimeInterval − 1) |
| 11.        Randomly select a value from the possible value set to replace the value at PartsSuppliers [i][j] |
| 12.     END FOR |
| 13. |
| 14.     FOR i := 0 to numOfAssemblyLines DO |
| 15.        Random select R positions where the mutate process will happen, and denoted by pos[R]. (R< numOfTimeInterval, and 0 ≤ pos[R] ≤ numOfTimeInterval − 1) |
| 16.        Randomly select a value from the possible value set to replace the value at AssemblyLines [i][j] |
| 17.     END FOR |
| 18.     Return new Chr |
| 19. END |

FIG. 9 illustrates an example implementation of the system 100 of FIG. 1, including various additional or alternative features and functions. Specifically, as shown, FIG. 9 illustrates a system 902 implementing the schedule manager 102 using the HANA (High Performance Analytical Appliance) product from SAP AG of Walldorf, Germany. As is known, HANA provides in-memory data management for fast, efficient processing of large volumes of data. Thus, FIG. 9 illustrates a memory 914, e.g., a random access memory (RAM) which may be used to implement the system of FIG. 9 as described herein.

ultimately, just-in-time delivery of products (automobiles) 912 may be provided in satisfaction of the customer demands 908.

Further in the example of FIG. 9, collaborative scheduling 916 is illustrated as a result of various associated scheduling operations which are illustrated with respect to an implementation thereof using a business function library (BFL) 918. In other words, as shown, and as may be appreciated from the above description of FIG. 1, the collaborative scheduling 916 may refer in whole or in part to operations of the scheduler 124, the preference tuner 118, and/or the GUI 136. Meanwhile, features and functions of the BFL 918 may refer to operations of the sales forecaster 112, the genetic algorithm manager 122, and, as described below, various other additional or alternative operations not specifically illustrated in the example of FIG. 1.

Specifically, as illustrated, the BFL 918 may include a multi-objective scheduler 920 which may be implemented using the types of genetic algorithms described herein. Further, demand forecaster 922, similarly to the sales forecaster 112, may be implemented based on the customer demands 908, and using, for example, various linear regression techniques.

Further, simulations 924 may be provided which graphically illustrate results over time of potential scheduling solutions. Somewhat similarly, "what-if" analysis module 926 may provide a user of the system 902 with an ability to modify one or more parameters or characteristics of an associated production scenario, and may thereafter provide graphical or other representations of positive and negative results of such modifications on potential scheduling solutions. Finally in the example of FIG. 9, real time rescheduling module 928 may provide the user of the system 900 with an ability to make "on the fly" scheduling changes by leveraging a speed and accuracy of the underlying scheduling operations based on the genetic algorithm techniques described herein.

Figure 10:
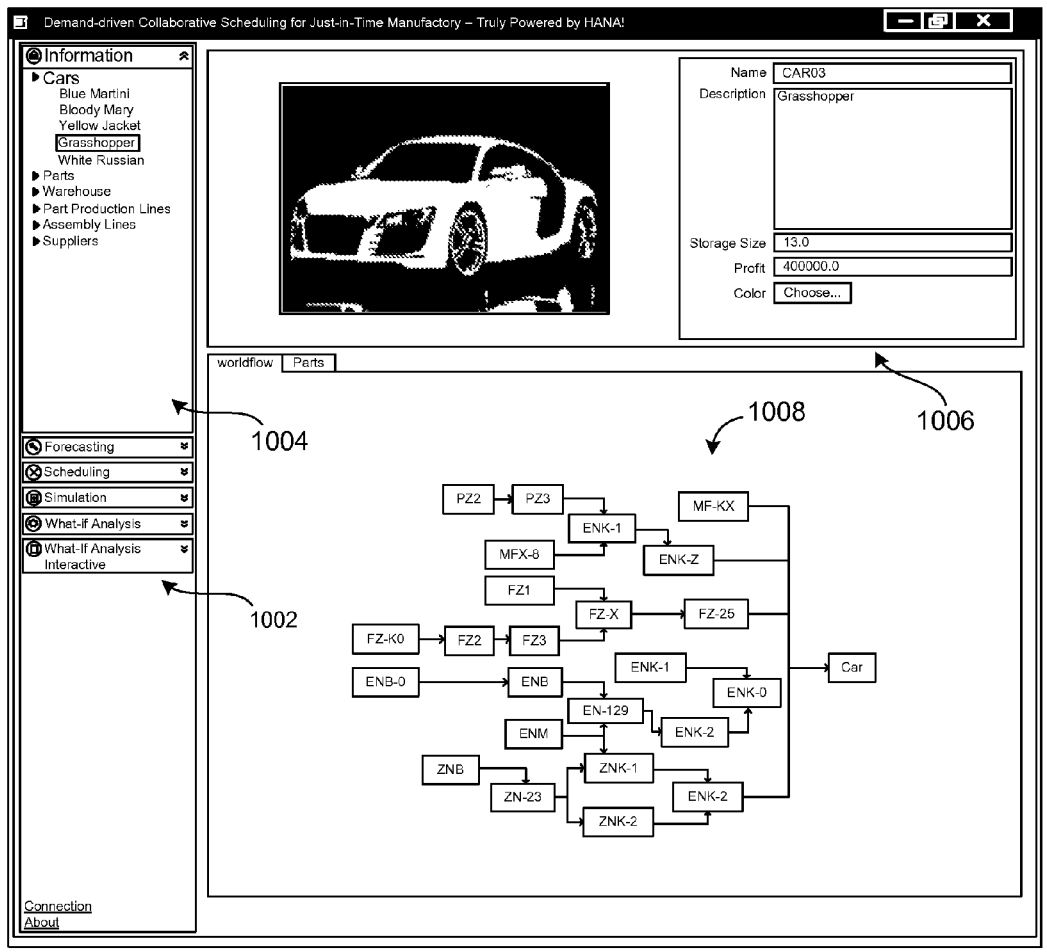
FIG. 10 is a first screenshot illustrating example operations of the system of FIG. 9.

FIGS. 10-17 are screenshots illustrating example operations of the system 900 of FIG. 9. Specifically, as shown in FIG. 10, a portion 1002 includes various drop-down lists which generally correspond to the modules 920-928 of FIG. 9. Thus, in FIG. 10, a portion 1004 is illustrated as having been selected, which, as shown, provides a user of the system 900 with an ability to select between various car models, as well as to select between and parameterize various items of information associated with the scheduling operations described herein, and generally representing, or corresponding to, the constraint data 113-117 of FIG. 1.

In the example of FIG. 10, a particular car model (Grasshopper) is selected, and displayed in a portion 1006 as being associated with a certain storage size and profit metric. In a portion 1008, a workflow tab has been selected which illustrates a corresponding workflow for producing the selected car model.

Figure 11:
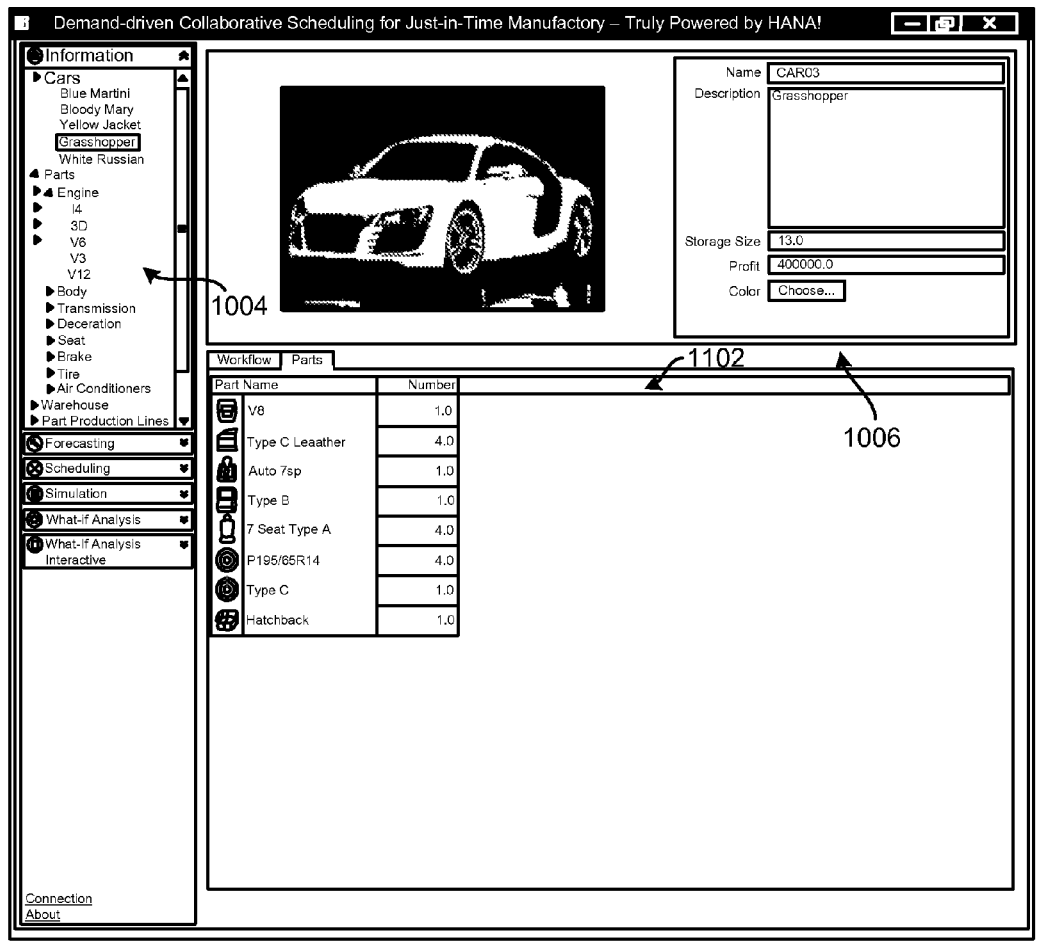
FIG. 11 is a second screenshot illustrating example operations of the system of FIG. 9.

FIG. 11 illustrates a variation of FIG. 10 in which a parts tab is selected as illustrated in a portion 1102. As shown, selection of the parts tab results in a display of various associated parts used in assembling the selected car, as well as a number of such parts needed. Although not specifically illustrated with respect to FIGS. 10 and 11, it may be appreciated that the information portion selected from the portion 1002 may be further utilized to select and input various other values associated with the population of chromosomes to be generated and used in the genetic algorithm techniques described herein.

Figure 12:
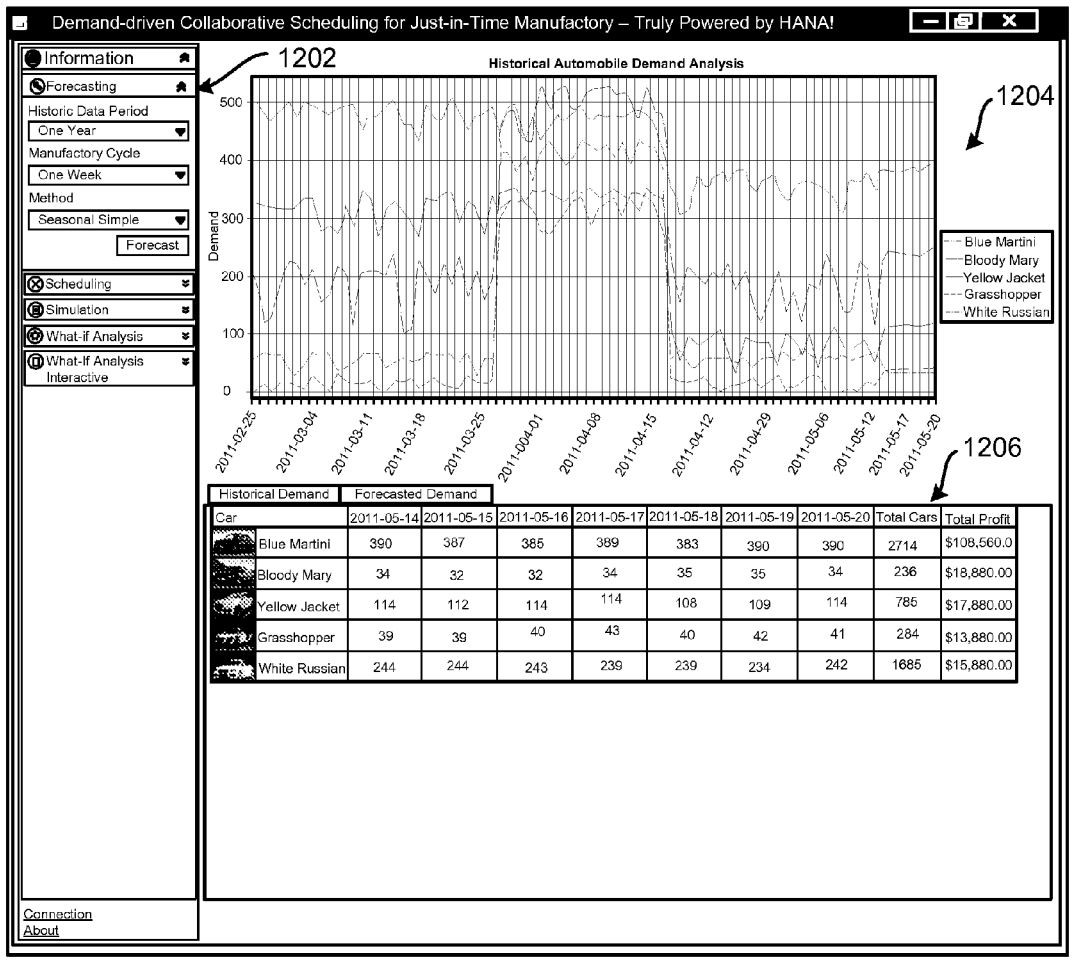
FIG. 12 is a third screenshot illustrating example operations of the system of FIG. 9.

In the example of FIG. 12, a portion 1202 illustrates selection of a forecasting drop-down menu from within the portion 1002. As shown, the portion 1202 may enable selection of a desired historical data period, manufacturing cycle, and associated forecasting techniques (in the example, a "seasonal simple") algorithm is used which forecast sales data based on seasons of the year. Thus, in FIG. 11, a portion 1204 illustrates a historical automobile demand analysis for the various car types of FIG. 10, over a designated time period. Consequently, a portion 1206 may be provided which illustrates a forecast demand for each car type over a relevant time period, so that a total number of cars forecasted to be sold may be obtained, and a corresponding total profit may be calculated.

Figure 13:
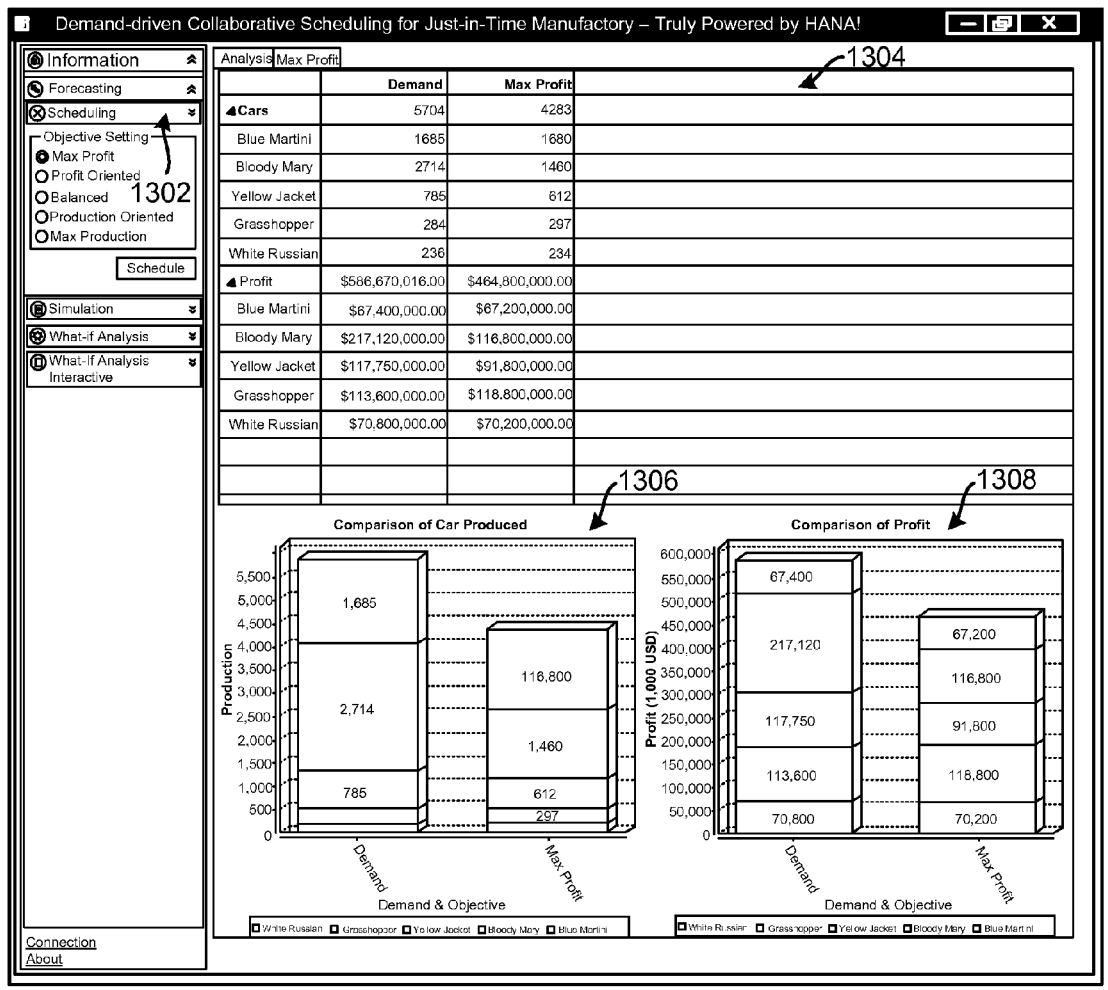
FIG. 13 is a fourth screenshot illustrating example operations of the system of FIG. 9.

In FIG. 13, the portion 1002 illustrates selections of a drop-down list for parameterizing schedule operations in a portion 1302. As shown, such operations may include selection of a desired objective setting, where, as illustrated and as described above, such objectives may include (but are not limited to) maximum profit, maximum production, or variations or combinations thereof.

In the example of FIG. 13, as shown, the maximum profit objective has been selected, so that a corresponding analysis in a portion 1304 may be provided which illustrates projected demand and associated profits associated with each car type to be produced. Further, a portion 1306 illustrates a comparison of the various cars to be produced in terms of a production thereof relative to a demand and maximum profit associated therewith. For example, it may be observed from portion 1306 that, for some produced automobiles, there may be either a positive or negative correlation between demand and associated maximum profit. Similarly, in a portion 1308, a profit comparison between the various car types is illustrated, which illustrates again that there may be a positive or negative correlation between demands for the given car type and associated maximum profit associated therewith.

Thus, portions 1304-1308 generally illustrate that some automobiles may be more in demand and/or more profitable than other types of automobiles. Consequently, selection of maximum profit as an objective may result in a corresponding maximizing of production of the relatively profitable automobile types. On the other hand, it may be appreciated that such relative profitability may be diminished if production exceeds demand. Therefore, FIG. 9 illustrates example techniques for maximizing production of most-profitable cars, but taking into account relative level of demand for each, as illustrated in the example of FIG. 13.

FIG. 14 illustrates a variation of FIG. 13, in which a max profit tab has been selected for display, as shown in a portion 1406. As illustrated, the portion 1406 illustrates a selected schedule for manufacturing, and thus effectively represents an example chromosome that may be used in the systems of FIGS. 1, 5, 9, as generally illustrated in the examples of FIGS. 2 and 3 above.

Figure 15:
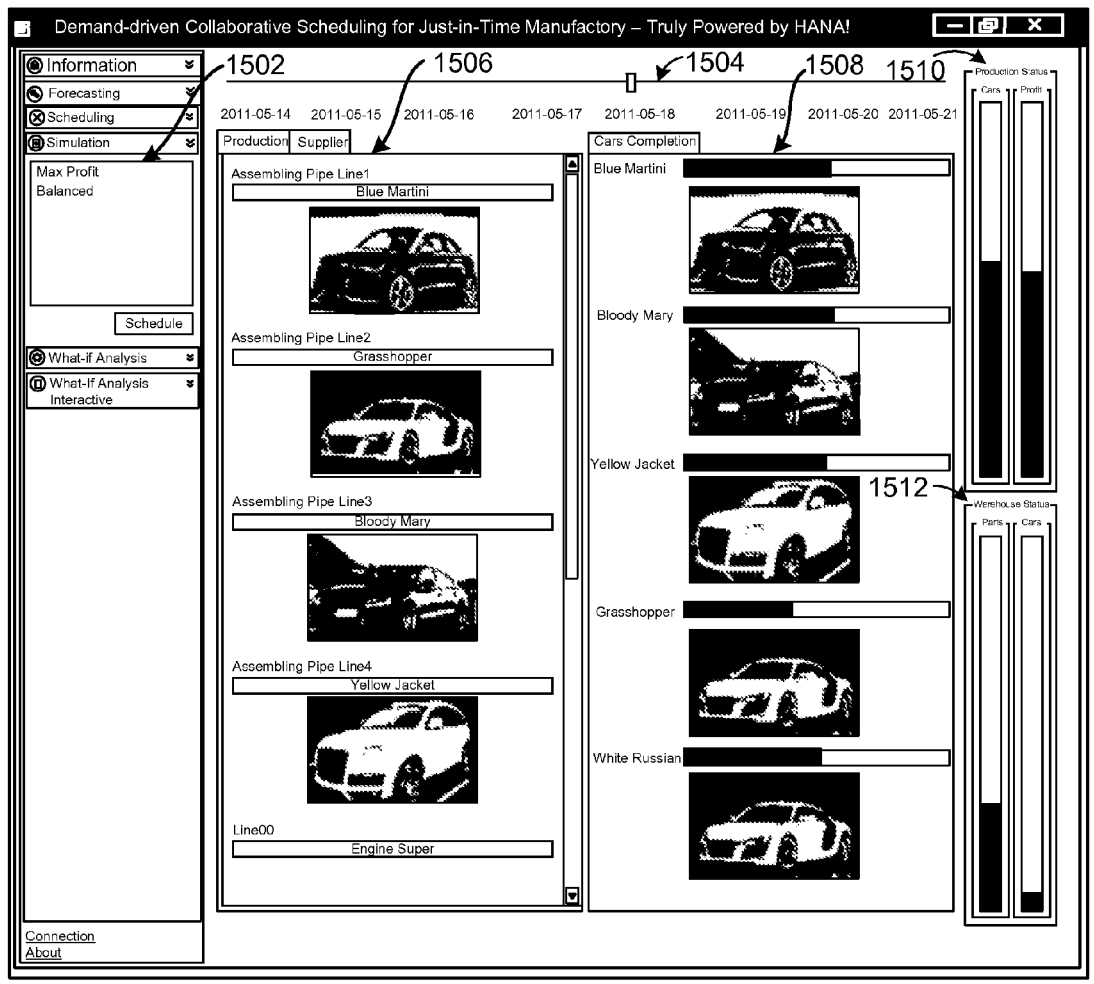
FIG. 15 is a sixth screenshot illustrating example operations of the system of FIG. 9.

FIG. 15 illustrates a further example in which a portion 1502 of the portion 1002 is selected and illustrates simulation operations which may be selected in the context of the illustrated schedule in the operations. As shown, a timeline 1504 may include a sliding scale which may be graphically moved using a sliding bar or other conventional graphical technique. Then, a portion 1506 illustrates production information associated with the various car types while a portion 1508 illustrates associated levels of completion of production of the various car types. Then, a portion 1510 illustrates a production status of a total number of cars relative to a total profit, while a portion 1512 illustrates a warehouse status with respect to storage of individual parts and completed cars.

Thus, it may be appreciated in the example of FIG. 15 that movement of the sliding bar along the timeline 1504 may be associated with instantaneous visual illustration of projections of manufacturing, storage, and sales of the various cars. In the example, the sliding bar is set to the date of May 18, 2011, and, in the portion 1508, bar graphs associated with each car type are shown at a certain level indicating a corresponding level of completion of each associated car type. Similarly, bar graphs in portions 1510 and 1512 illustrate a corresponding total production status and warehouse status information as of the selected date. Of course, it may be appreciated that movement of the sliding bar along the timeline 1504 may raise or lower any or all of the various bar graphs or other illustrations of the associated metric. In this way, a user of the system 900 of FIG. 9 may utilize the interface of FIG. 15 to visualize relative production, profit, and warehouse information over time, and with respect to each individual model type being produced.

Figure 16:
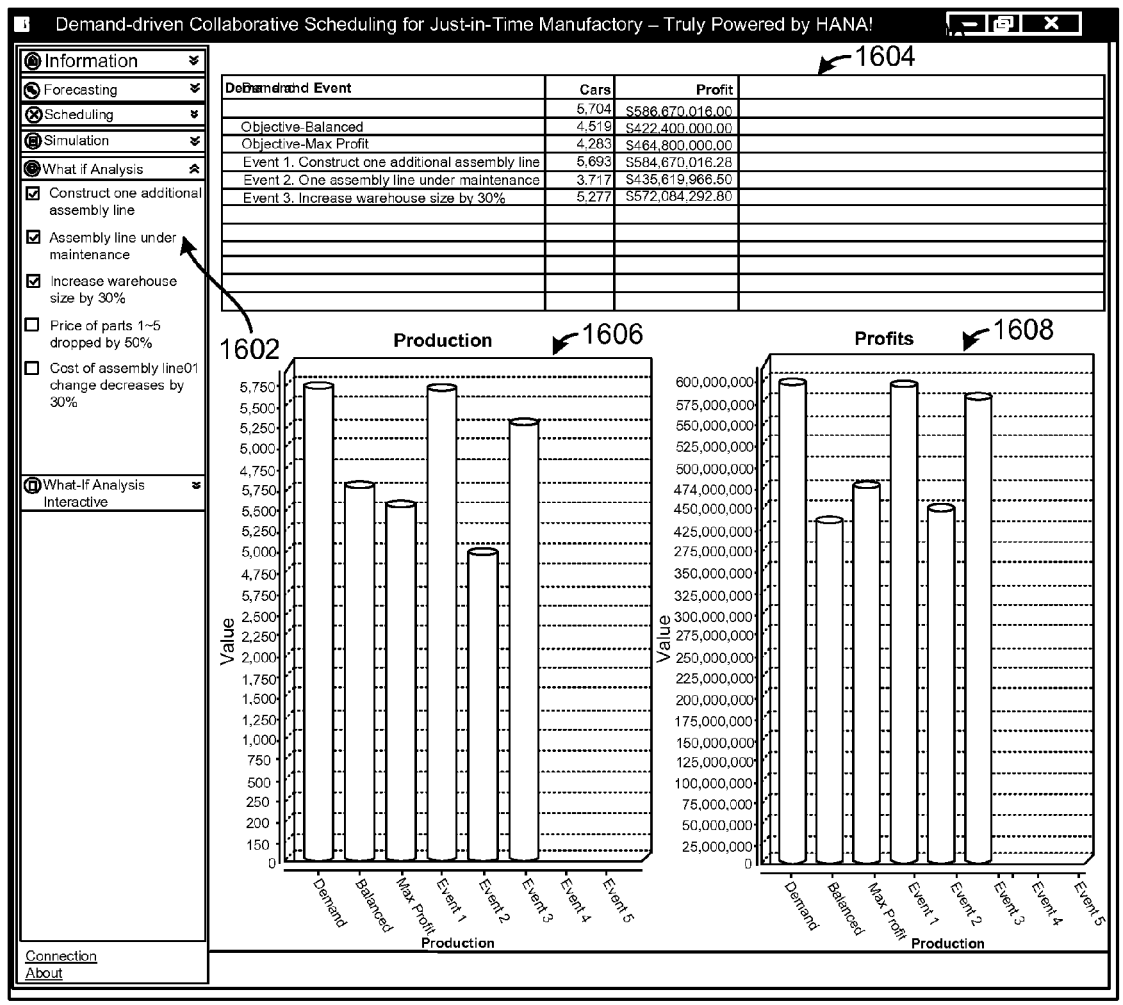
FIG. 16 is a seventh screenshot illustrating example operations of the system of FIG. 9.

FIG. 16 illustrates an example in which a portion 1602 is selected which illustrates various examples of the types of "what-if" analysis described above with respect to the corresponding module 926 of FIG. 9. In the example, the portion 1602 includes options such as using an additional assembly line, having one assembly line under maintenance and out of commission, increasing warehouse size by 30%, prices of various parts being reduced, and a change cost of a given assembly line being decreased. As may be appreciated, a user of the interface of FIG. 16 may usually check to select any one or more of the various "what-if" analysis options. In this way, the user may easily and quickly visualize the effects of such possible scenarios.

Thus, in the example, a portion 1504 illustrates the parameters associated with the current scheduling operations, including the various events selected on the context of the "what-if" analysis of the portion 1602. Consequently, a portion 1606 may provide production information and effects associated with the parameters of the portion 1604. Similarly, a portion 1608 illustrates profit information associated with the parameters and events of the portion 1604.

Figure 17:
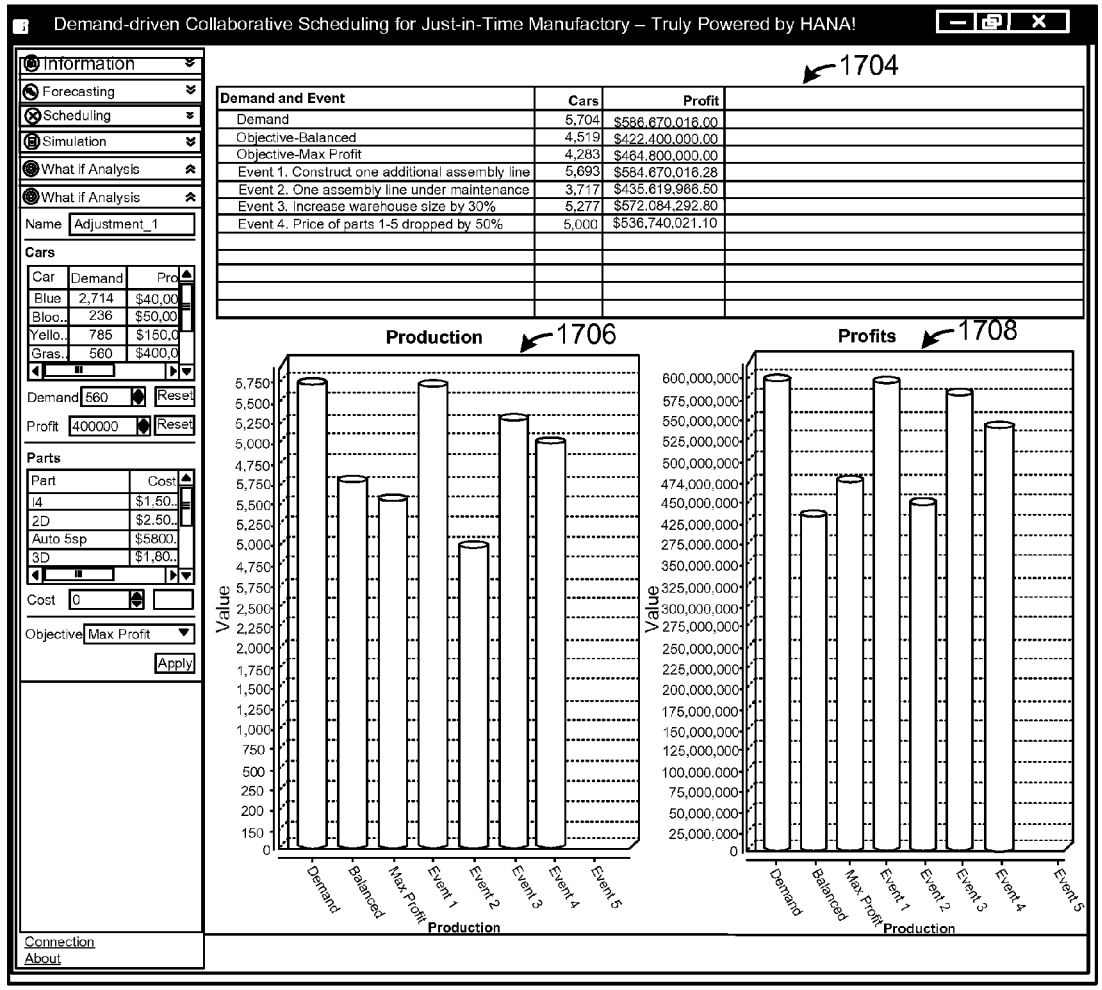
FIG. 17 is an eighth screenshot illustrating example operations of the system of FIG. 9.

FIG. 17 illustrates an example in which a portion 1702 is selected for performing interactive "what-if" analysis. Thus, the example of FIG. 17 is conceptually similar to the "what-if" analysis of FIG. 16, above. For example, as shown, the portion 1702 is illustrated as enabling the operator of the system 900 of FIG. 9 to select between various discreet or continuous values for various parameters associated with the current scheduling operation. For example, as shown, the operator may input various values for projected demand and/or profit associated with each car type, as well as values associated with cost and availability of various parts, as well as a selection of and between the various objective types.

Upon designation of these parameters, portion 1704-1708 corresponding to portion 1604-1608 of FIG. 16 may be illustrated. Specifically, as shown, the portion 1704 includes the various selected parameters and values, while the portion 1706 illustrates resulting effects thereof on production, and the portion 1708 illustrates corresponding effects thereof on profits.

Implementations of the various techniques described herein may be implemented in digital electronic circuitry, or in computer hardware, firmware, software, or in combinations of them. Implementations may be implemented as a computer program product, i.e., a computer program tangibly embodied in an information carrier, e.g., in a machine-readable storage device or in a propagated signal, for execution by, or to control the operation of, data processing apparatus, e.g., a programmable processor, a computer, or multiple computers. A computer program, such as the computer program(s) described above, can be written in any form of programming language, including compiled or interpreted languages, and can be deployed in any form, including as a stand-alone program or as a module, component, subroutine, or other unit suitable for use in a computing environment. A computer program can be deployed to be executed on one computer or on multiple computers at one site or distributed across multiple sites and interconnected by a communication network.

Method steps may be performed by one or more programmable processors executing a computer program to perform functions by operating on input data and generating output. Method steps also may be performed by, and an apparatus may be implemented as, special purpose logic circuitry, e.g., an FPGA (field programmable gate array) or an ASIC (application-specific integrated circuit).

Processors suitable for the execution of a computer program include, by way of example, both general and special purpose microprocessors, and any one or more processors of any kind of digital computer. Generally, a processor will receive instructions and data from a read-only memory or a random access memory or both. Elements of a computer may include at least one processor for executing instructions and one or more memory devices for storing instructions and data. Generally, a computer also may include, or be operatively coupled to receive data from or transfer data to, or both, one or more mass storage devices for storing data, e.g., magnetic, magneto-optical disks, or optical disks. Information carriers suitable for embodying computer program instructions and data include all forms of non-volatile memory, including by way of example semiconductor memory devices, e.g., EPROM, EEPROM, and flash memory devices; magnetic disks, e.g., internal hard disks or removable disks; magneto-optical disks; and CD-ROM and DVD-ROM disks. The processor and the memory may be supplemented by, or incorporated in special purpose logic circuitry.

To provide for interaction with a user, implementations may be implemented on a computer having a display device, e.g., a cathode ray tube (CRT) or liquid crystal display (LCD) monitor, for displaying information to the user and a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input.

Implementations may be implemented in a computing system that includes a back-end component, e.g., as a data server, or that includes a middleware component, e.g., an application server, or that includes a front-end component, e.g., a client computer having a graphical user interface or a Web browser through which a user can interact with an implementation, or any combination of such back-end, middleware, or front-end components. Components may be interconnected by any form or medium of digital data communication, e.g., a communication network. Examples of communication networks include a local area network (LAN) and a wide area network (WAN), e.g., the Internet.

While certain features of the described implementations have been illustrated as described herein, many modifications, substitutions, changes and equivalents will now occur to those skilled in the art. It is, therefore, to be understood that the appended claims are intended to cover all such modifications and changes as fall within the scope of the embodiments.

What is claimed is:

1. A computer system including instructions recorded on a non-transitory computer-readable medium and executable by at least one processor, the system comprising:
   a schedule manager configured to cause the at least one processor to determine a schedule of each of a plurality of manufacturing resources used to manufacture one or more items, relative to one or more time intervals, wherein the schedule manager includes
   an input handler configured to determine constraints related to the manufacturing resources and to the one or more items;
   a chromosome comparator configured to compare a plurality of schedule chromosomes, each schedule chromosome representing a potential schedule and including a plurality of time periods and, for each of the plurality of time periods:
  a supply quantity for at least one part used to manufacture the one or more items, and
  a type of output produced by at least one manufacturing facility resource used to manufacture the one or more items,
the chromosome comparator also configured to evaluate each of the plurality of schedule chromosomes relative to the constraints, to thereby output a selected subset of highest scoring chromosomes of the plurality of schedule chromosomes, the evaluation accounting for a warehouse size, total items produced, and costs to switch outputs produced by a manufacturing resource during the potential schedule;
a chromosome combiner configured to combine schedule chromosomes of the selected subset of the plurality of schedule chromosomes to obtain a next generation of schedule chromosomes for output to the chromosome comparator and for subsequent comparison therewith of the next generation of schedule chromosomes with respect to the constraints, as part of an evolutionary loop of the plurality of schedule chromosomes between the chromosome comparator and the chromosome combiner; and
a scheduler configured to monitor the evolutionary loop and to select a selected schedule chromosome therefrom for implementation of the schedule based thereon.

2. The system of claim 1, wherein the constraints include at least one metric against which the potential schedules are judged, and wherein the schedule manager comprises a preference tuner configured to designate the at least one metric.

3. The system of claim 2 wherein the at least one metric includes a profit per item metric based on forecasted sales data and customer demand data for the one or more items.

4. The system of claim 2 wherein the at least one metric includes a relative utilization of the manufacturing resources in manufacturing the one or more items.

5. The system of claim 1 wherein the manufacturing resources include one or more of at least one parts production line, at least one assembly line, at least one parts supplier, and at least one warehouse.

6. The system of claim 1, wherein the schedule manager comprises a sales forecaster configured to forecast future sales data for the one or more items based on historical sales data thereof, and wherein the forecasted future sales data is included in the constraints.

7. The system of claim 1, wherein the schedule manager includes a simulation module configured to simulate a total number of items relative to total profit of the selected schedule over time.

8. The system of claim 1, wherein the schedule manager includes a what-if module configured to change a quantity of the manufacturing facility resources to simulate an effect of the change to the selected schedule over time.

9. The system of claim 1 wherein the chromosome combiner is configured to combine the schedule chromosomes including selecting pairs of schedule chromosomes and crossing over portions of each pair to obtain a child chromosome of the next generation.

10. The system of claim 1 wherein at least a portion of the evolutionary loop is executed using parallel processes in which each generation of schedule chromosomes is divided into sub-groups for parallel processing thereof.

11. The system of claim 1 wherein the scheduler is configured to select the selected schedule chromosome after a pre-determined number of generations of the evolutionary loop, or after determining that the selected chromosome satisfies the constraints to a pre-determined extent.

12. A computer-implemented method, comprising:
defining a schedule of each of a plurality of manufacturing resources used to manufacture one or more items, relative to one or more time intervals;
determining constraints related to the manufacturing resources and to the one or more items,
evaluating a plurality of schedule chromosomes, each schedule chromosome representing a potential schedule and including a plurality of time periods and, for each of the plurality of time periods:
  a supply quantity for at least one part used to manufacture the one or more items, and
  a type of output produced by at least one manufacturing facility resource used to manufacture the one or more items,
the evaluating including comparing each of the plurality of schedule chromosomes relative to the constraints, and accounting for a warehouse size, total items produced during the potential schedule, and costs to switch outputs produced by a manufacturing resource during the potential schedule;
outputting a selected subset of the evaluated plurality of schedule chromosomes; combining schedule chromosomes of the selected subset of the plurality of schedule chromosomes to obtain a next generation of schedule chromosomes for subsequent evaluation therewith of the next generation of schedule chromosomes with respect to the constraints, as part of an evolutionary loop of the plurality of schedule chromosomes; and
selecting a selected schedule chromosome from the selected subset for implementation of the schedule based thereon.

13. The method of claim 12, wherein the constraints include forecasted future sales data based on historical sales data for the one or more items.

14. The method of claim 12 wherein the selected schedule chromosome is selected after a pre-determined number of generations of the evolutionary loop, or after a determination that the selected chromosome satisfies the constraints to a pre-determined extent.

15. A computer program product tangibly embodied on a non-transitory computer-readable storage medium and comprising instructions that, when executed by at least one processor, are configured to:
define a schedule of each of a plurality of manufacturing resources used to manufacture one or more items, relative to one or more time intervals;
determine constraints related to the manufacturing resources and to the one or more items,
evaluate a plurality of schedule chromosomes, each schedule chromosome representing a potential schedule and including a plurality of time periods and, for each of the plurality of time periods:
  a supply quantity for at least one part used to manufacture the one or more items, and
  a type of output produced by at least one manufacturing facility resource used to manufacture the one or more items, wherein evaluating the plurality of schedule chromosomes includes comparing each of the plurality of schedule chromosomes relative to the constraints and accounting for a warehouse size, total items produced during the potential schedule, and costs to switch outputs produced by a manufacturing resource during the potential schedule;

output a selected subset of the evaluated plurality of schedule chromosomes;

combine schedule chromosomes of the selected subset of the plurality of schedule chromosomes to obtain a next generation of schedule chromosomes for subsequent evaluation therewith of the next generation of schedule chromosomes with respect to the constraints, as part of an evolutionary loop of the plurality of schedule chromosomes; and select a selected schedule chromosome from the selected subset for implementation of the schedule based thereon.

16. The computer program product of claim 15, wherein the constraints include at least one metric against which the potential schedules are judged, and wherein the at least one metric is received from a user.

17. The computer program product of claim 15, wherein the constraints include forecasted future sales data based on historical sales data for the one or more items.

18. The computer program product of claim 15, wherein the instructions, when executed, are configured to simulate an effect of the selected schedule over time.

19. The computer program product of claim 15, wherein the instructions, when executed, change a quantity of the manufacturing facility resources to simulate an effect of the change on the selected schedule over time.

20. The computer program product of claim 15 wherein the selected schedule chromosome is selected after a pre-determined number of generations of the evolutionary loop, or after a determination that the selected chromosome satisfies the constraints to a pre-determined extent.

* * * * *